United States Patent
Blaylock et al.

(10) Patent No.: US 11,017,576 B2
(45) Date of Patent: May 25, 2021

(54) REFERENCE MODEL PREDICTIVE TRACKING AND RENDERING

(71) Applicant: Visyn Inc., Lino Lakes, MN (US)

(72) Inventors: Andrew John Blaylock, Minneapolis, MN (US); Jeffrey Thielen, Lino Lakes, MN (US)

(73) Assignee: Visyn Inc., Lino Lakes, MN (US)

( * ) Notice: Subject to any disclaimer, the term of this patent is extended or adjusted under 35 U.S.C. 154(b) by 0 days.

(21) Appl. No.: 16/425,623

(22) Filed: May 29, 2019

(65) Prior Publication Data

US 2020/0058148 A1 Feb. 20, 2020

Related U.S. Application Data

(60) Provisional application No. 62/678,073, filed on May 30, 2018.

(51) Int. Cl.
*G06T 13/00* (2011.01)
*G06T 13/40* (2011.01)
*G06T 7/246* (2017.01)

(52) U.S. Cl.
CPC .............. *G06T 13/40* (2013.01); *G06T 7/248* (2017.01); *G06T 2207/30196* (2013.01)

(58) Field of Classification Search
USPC ......................................................... 345/474
See application file for complete search history.

(56) References Cited

U.S. PATENT DOCUMENTS

| 10,679,396 | B2 | 6/2020 | Thielen et al. |
| 2003/0077556 | A1* | 4/2003 | French .............. A63B 69/0053 434/258 |
| 2012/0206577 | A1 | 8/2012 | Guckenberger et al. |
| 2014/0193132 | A1 | 7/2014 | Lee et al. |
| 2015/0089551 | A1 | 3/2015 | Bruhn et al. |
| 2016/0101321 | A1 | 4/2016 | Aragones et al. |
| 2016/0179206 | A1 | 6/2016 | Laforest |

(Continued)

OTHER PUBLICATIONS

U.S. Appl. No. 16/035,280, filed Jul. 13, 2018, Holographic Multi Avatar Training System Interface and Sonification Associative Training.

(Continued)

*Primary Examiner* — Gordon G Liu
(74) *Attorney, Agent, or Firm* — Schwegman Lundberg & Woessner, P.A.

(57) ABSTRACT

A system and method may be used for reference model predictive tracking and rendering. Systems and methods may use computational systems, networking, or display hardware to seamlessly allow users to see their motion in real-time. The systems and methods may provide the brain the extra visual information to help a user converge to highly efficient high-quality technique (e.g., movement control) more rapidly than other processes. An approach to generating accurate models in delayed processing may include treating depth-sensor-derived skeletal inference of body position as statistical data about the underlying motion rather than a representation of that motion itself. In an example, a process for slicing up a time-series of body constructions in a motion model may use a full time series of positions for individual body segments, creating trajectories.

20 Claims, 13 Drawing Sheets

(56) References Cited

U.S. PATENT DOCUMENTS

| | | | |
|---|---|---|---|
| 2016/0267577 A1* | 9/2016 | Crowder | G06F 3/011 |
| 2017/0069125 A1* | 3/2017 | Geisner | G06K 9/00342 |
| 2017/0134639 A1* | 5/2017 | Pitts | H04N 5/23212 |
| 2018/0047200 A1 | 2/2018 | O'hara et al. | |
| 2019/0019321 A1 | 1/2019 | Thielen et al. | |
| 2020/0273229 A1 | 8/2020 | Thielen et al. | |

OTHER PUBLICATIONS

"U.S. Appl. No. 16/035,280, Non Final Office Action dated Aug. 30, 2019", 20 pages.

"U.S. Appl. No. 16/035,280, Response filed Dec. 30, 2019 to Non Final Office Action dated Aug. 30, 2019", 8 pgs.

"U.S. Appl. No. 16/035,280, Final Office Action dated Jan. 13, 2020", 22 pgs.

"U.S. Appl. No. 16/035,280, Examiner Interview Summary dated Mar. 6, 2020", 3 pgs.

"U.S. Appl. No. 16/035,280, Response filed Mar. 13, 2020 to Final Office Action dated Jan. 13, 2020", 9 pgs.

"U.S. Appl. No. 16/035,280, Advisory Action dated Mar. 23, 2020", 4 pgs.

"U.S. Appl. No. 16/035,280, Response filed Apr. 13, 2020 to Advisory Action dated Mar. 23, 2020", 10 pgs.

"U.S. Appl. No. 16/035,280, Notice of Allowance dated Apr. 22, 2020", 9 pgs.

"U.S. Appl. No. 15/931,144, Non Final Office Action dated Oct. 27, 2020", 20 pgs.

* cited by examiner

REFERENCE MODEL PREDICTIVE TRACKING AND RENDERING

CLAIM OF PRIORITY

The present application claims the benefit of priority of U.S. Provisional Application Ser. No. 62/678,073, filed May 30, 2018, which is incorporated herein by reference in its entirety.

BACKGROUND

Human brains are amazingly powerful associative learning machines. If two phenomena hit a person's sensory systems consistently together in time, the brain may create an associative memory to link those two phenomena. To the degree that those two phenomena themselves contain parsimonious information (internal structure), the brain may find correlated patterns within said phenomena and may encode deep structural relationships between those phenomena. This apparently happens automatically and effortlessly.

When a human creates movement, two data streams are available to them. One is the output motor patterns (which themselves generate predictions about the sensory information expected to result from those motor actions) and the other is returning sensation. A lot of learning is achieved by comparing these two streams.

However, consider how salient returning sensory information during a motion is compared to a visual of that same motion when it comes to the tiny details about what happened. The visual seems to provide more value when it comes to analyzing the motion in detail.

The implication of this is implemented in weight rooms all around the world. Mirrors are installed so that people can execute, feel, and see their motion all at the same time. Mirrors work well, but offer minimal flexibility in terms of angle of view and other features.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present systems and methods use computational systems, networking, and display hardware to seamlessly allow users to see their motion in real-time. This affords the brain the extra visual information that may help a person converge to highly efficient high-quality technique (movement control) more rapidly than other processes.

Further, the systems and methods described herein enable additional exercises that can enhance a user's rate of improvement. These include automatically synchronizing an expert version of a motion to the precise speed and timing of a user's motion in real-time. In fact, this can be set so the expert slightly leads the user providing online position targets for the user at all times during motion. The expert version may include an expert model or an expert avatar, which are used interchangeably throughout this disclosure.

Returning to the concept of real-time viewing of a user's motion, every nanosecond is precious when trying to deliver stimulus to a user which is intended to be reflective of what is happening in the real world in the same instant that it is displayed.

A prediction is used to generate simultaneous experience of a situation and a representation of that same experience in a computerized medium. However, the low accuracy of this type of prediction due to the open-ended nature of what can happen in the real world is a limiting factor in some examples.

In the present disclosure, the systems and methods described herein may predict human movement. Human movement is subject to the conservation of momentum. Therefore, on short time scales, velocities tend to be similar from one instant to the next. The specific motion that the user attempts to perform may be known in advance. These two bases taken together are used to place strong limits on the possible positions the user can move to a fraction of a second in the future.

The systems and methods described herein place those bases on a firm quantitative and geometrical foundation. They define the computational steps needed to generate accurate predictions of future user positions. They also describe some additional human movement training opportunities which emerge from the computational steps involved in the process of generating predictions.

Figure 1:
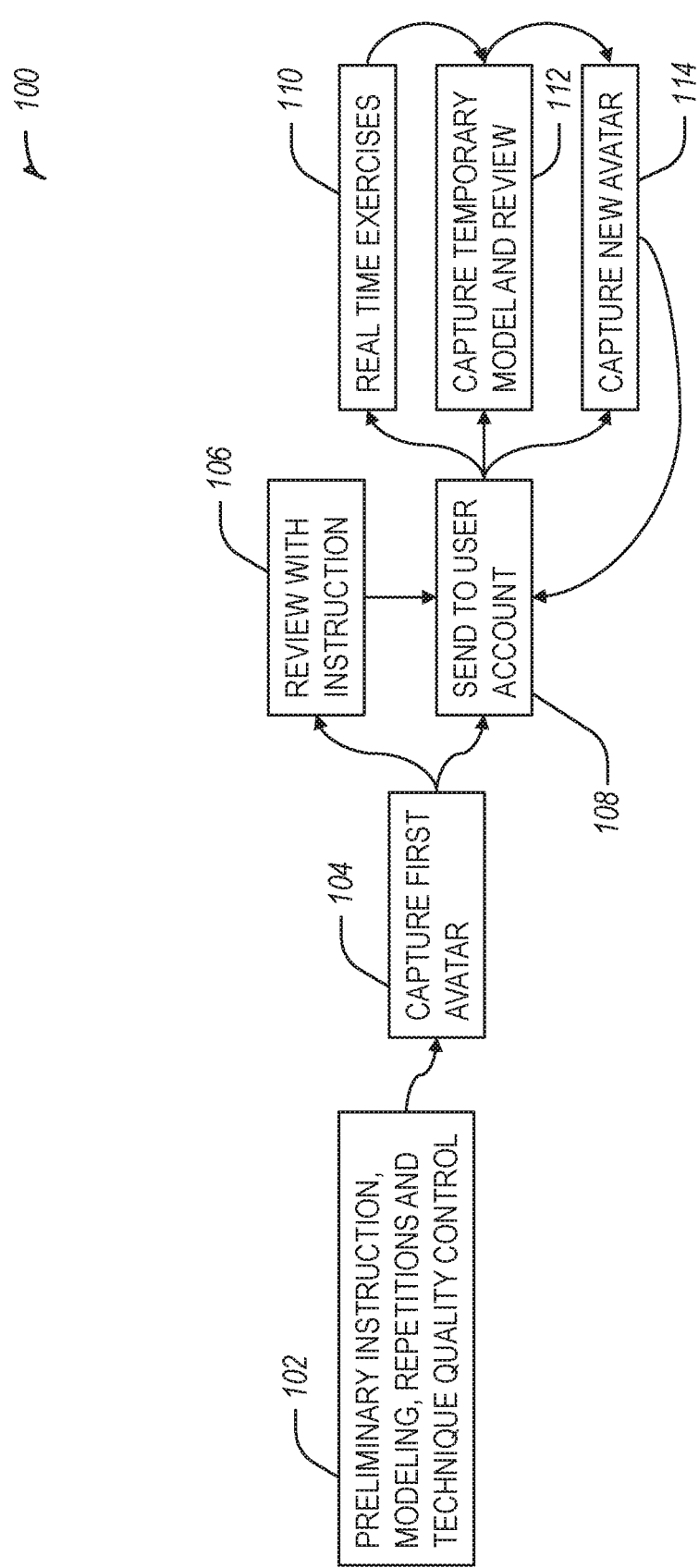
FIG. 1 illustrates an overview data flow diagram for predictive tracking and rendering in accordance with some examples.

FIG. 1 illustrates an overview data flow diagram for predictive tracking and rendering in accordance with some examples.

A global process flow diagram 100 appears in FIG. 1. This may represent a feedback loop between a user (e.g., a student) and an instructor assuming the present system is in place.

A process includes using trajectory inference from a position sensor, such as a depth sensor or a 3D position sensor (e.g., local positioning sensor). Derived skeletal constructions may include manipulations of depth sensor data and previously-established motion models independent and with respect to each other in order to enable efficient teaching of human movement skills. In an example, a motion model of a human movement can be a 5-dimensional object. These dimensions are the usual four dimensions of space-time (three for positioning things in space and one for time) plus an additional parameter that specifies which body segment the other four dimensions are specifying with spatial and time coordinates. These body segments can be listed and numbered 1 to n (where n depends on the specific human body model used in the motion model). Thus this dimension is a discretely varying dimension that can take n values.

Movement data can be broken up into a time series of body positions. In another example, movement data can include a time series of positions for individual body segments. In the systems and methods described herein, a time series of positions of a body segment may be referred to as a "trajectory". Operations may be performed on these trajectories (making sure to keep a good account of the time parameter) by processing them so as to make them more accurate or to predict future movement before recombining them into full motion models, or output predictions into time-slice full-body positions.

This trajectory inference process may be used to enable a parallelized and cross-constraining real-time body position sensing and virtual-representation-constructing system to:

1. Improve reliability of point-cloud depth sensor skeletal tracking
2. Reduce latency to delivery of representation (visual, audio, or other sensory mode) construction
3. Deliver this construction to a data representation pipeline such as animation with minimal latency.

The process may utilize statistical inference on trajectories with a cross-constraining method to improve the smoothness and accuracy of position sensor (e.g., depth sensor) tracking in generating motion models when real-time delivery is not used.

Example processes may include modeling motion in runtime. For example, it may be known in advance what action a user is be trying to execute. This allows rational prediction of near-future motions from the continuity of the motion implicit in a time series of a motion-captured representation of the action. Knowing the action may allow for pruning of a search space for a nearest neighbor algorithm, which may serve as a basis for predictions (as well as enabling additional visual modeling opportunities within the system).

Example processes may include modeling motion based on a full time series when minimizing time to representation delivery is not critical. Representational models of user motion may be generated in a non-real-time case to leverage extra processing time to ensure precision and accuracy. Then, in a real-time case, these models may be used in a prediction process to start finding near-future body positions, for example well in advance of targeted-time-to-display. These may then be handed off to the pipelines for construction representation early to eliminate latency (e.g., within a real-time system).

Modeling inputs may include, while in runtime predicting: current depth-sensor-sourced locations of body segments, forward technique models from recent instants in the time series of body segment locations, current confidence intervals, reference model data for analogous instant in its time series, or the like.

Modeling inputs may include, while in post processing (for example not prediction, but instead inference from what is treated as statistical data): instant-specific depth-sensor-sourced locations of body segments, time-series-and-body-segment-tagged confidence intervals on measured body segment positions, reference model data (e.g., data from previously established models which consisted of a user or expert attempting the same motion) for analogous instant in its time series, or the like.

In an example, forward models are constructed at previous instances in the time series using pre-existing Reference Model data specific to the instances in which they are constructed (Backward models, if used, are similarly constructed from subsequent instances). In an example, using the reference model data includes first matching the user's progress through the technique to the most similar moments in the reference model technique through the matching algorithm.

The global process flow diagram 100 includes a block 102 for preliminary instruction, modeling, repetitions, or process quality control. For example, an instructor leads the user through initial description, demonstration, repetitions and feedback, but with no 3D capture (and no review of user motion) until the user has sufficient similarity to a quality swing (e.g., as defined in the reference model). The global process flow diagram 100 may use the similarity to "recognize" the motion and produce good tracking.

The global process flow diagram 100 includes a block 104 to capture a first user avatar. The global process flow diagram 100 includes a block 106 to review with instruction, for example, at various speeds and views, such as full speed, slow motion, frozen position, side by side with expert, overlay with expert, with motion graphics embellishments, with instructor description or demonstration of a next step, or the like.

The global process flow diagram 100 includes a block 108 to send data to a user account. For example, after attempting to capture an avatar, the instructor may determine (or an automated system may determine) whether to upload or redo the capture until it is at a sufficient level of quality (the standard of quality here may include a subjective opinion of the instructor).

The global process flow diagram 100 includes a block 110 to perform or record real-time exercises, for example using predictive extrapolation of current motion referencing a current user avatar to improve the accuracy of forward kinematics.

The global process flow diagram 100 includes a block 112 to capture a temporary model and review. Block 112 may include a process similar to capturing a user avatar, but used for subsequent teaching and guided review with the instructor. Review at block 112 may be performed at different speeds or with different attributes, such as full speed, slow motion, frozen position, side by side reference model, overlay reference model, motion graphics embellishments, instructor description or demonstration of a next step, or the like.

The global process flow diagram 100 includes a block 114 to capture a new user avatar. The new user avatar construction process may be based not on an expert model, but instead on the previous user avatar as the previous user avatar may better predict the user's current motion. Processes disclosed herein may refer to the use of a "reference model". A reference model includes a previously obtained motion model of the same technique that the user is attempting in the process of creating the new user avatar. This may, for example, be either of an expert model or the previous user avatar for the same technique (if it exists). An expert model may be a motion model of the same technique performed by a world class expert.

The feedback from block 114 to 108 may include a portion of a process that involves returning to an earlier step an indefinite number of times leading to a loop.

The region of the global process flow diagram 100 exclusive of blocks 102 and 108 may rely on reference to a pre-existing motion model for the technique that the user is attempting or an algorithm which matches maximally similar points-of-time-progression through the technique between the user and the pre-existing model, for example, even in cases where the relative rates through process had been different at earlier points in the two models. This matching algorithm may run in real-time to assist in producing low-latency representations of body positions or in post processing to constrain accuracy. It may also be used in the review process to match up expert and user motions in side-by-side or overlay conditions.

Figure 2:
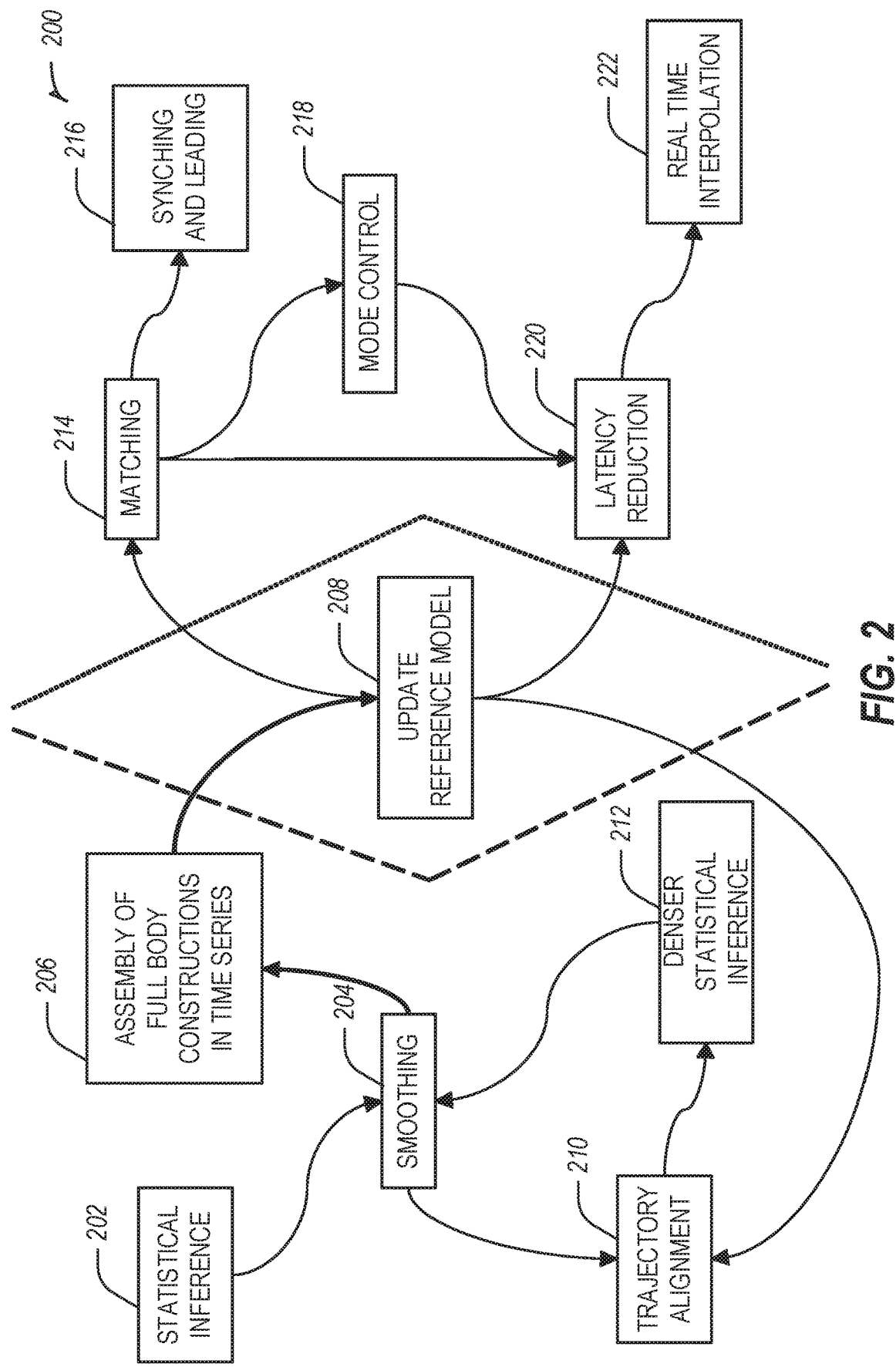
FIG. 2 illustrates a data flow diagram for reference model predictive rendering in accordance with some examples.

FIG. 2 illustrates a data flow diagram 200 for reference model predictive rendering in accordance with some examples.

The data flow diagram 200 may be used for management of latency, such as due to computational overhead of depth sensor skeletal inference. The data flow diagram 200 may be used to generate accurate motion models from noisy depth sensor data. The data flow diagram 200 may be used to leverage mechanisms for additional one-off features.

An approach to generating accurate models in delayed processing may include treating the depth-sensor-derived skeletal inference of body position as statistical data about the underlying motion rather than a representation of that motion itself. In an example, a process for slicing up a time-series of body constructions in a motion model may use a full time series of positions for individual body segments, creating "trajectories" as discussed above.

The data flow diagram 200 includes a block 202 to perform statistical inference on depth-sensor-inferred time-series body segment positions. The block 202 may output a connected path, which may be referred to as a "proto-trajectory," which may be sent to block 204. The data flow diagram 200 includes a block 204 to perform smoothing. For example, smoothing may include interpolating additional not-directly-measured positions onto the proto-trajectory such that the implied continuous trajectory is unchanged. Block 204 may output smooth trajectories and output, such as to block 206 or block 210. The data flow diagram 200 includes a block 206 to assemble full-body constructions in a time-series. The assembly may include breaking apart trajectory time-series to group like-time body segment positions for the full body and assemble into coherent human body constructions. Block 206 may output time series body positions, such as to block 208.

The data flow diagram 200 includes a block 208 to update a reference model, such as by sending time series body positions to a user account for use as the updated reference model. Block 208 may output an updated reference model for future operations, such as to block 214, 220, or 210. The data flow diagram 200 includes a block 210 for trajectory alignment, including positioning of reference model trajectories into the same space as a "smooth trajectory" for example translationally or rotationally. Block 210 may output overlaid trajectory data points, such as to block 212. The data flow diagram 200 includes a block 212 to perform denser statistical inference. For example, block 212 may output precise proto-trajectories, which are time inferred statistically from a mixture of an aligned trajectory from the reference model and a trajectory from the depth sensor data as feedback to block 204.

In an example, a targeted sensor may include a Microsoft Kinect from Microsoft Corporation, of Redmond, Wash., which is a depth sensor enhanced with a human skeleton inference algorithm that converts depth data to skeletal positional data. As described herein, "depth sensors" may include a general human skeletal position sensor. The processes described herein may use data generated by any human skeletal position sensors.

The data flow diagram 200 includes a block 214 to match reference model frames to frames from depth sensor data in real-time. Block 214 may output analogous user and reference model positions, for example to block 216, 218, or 220. The data flow diagram 200 includes a block 216 that may be used for synching by displaying matched reference model positions, or leading, by displaying reference model positions that are ahead in time compared to the user. Block 216 may output visual information displayed to the user, for example on a user interface of a display. The data flow diagram 200 includes a block 218 for mode control, including automated control of whether or not the system is in latency reduction mode. Block 218 may output data for use in latency reduction when the user is executing a certain technique and not otherwise, which may be sent to block 220. The data flow diagram 200 includes a block 220 for latency reduction. Block 220 may include projecting the user's position into the future by applying calculus concepts to the reference model data and applying changes predicted therein to the user's current position, for example, as quantified in real-time by sensors. Block 220 may output projected positions of the user so the rendering pipeline can deliver them closer to when the user is actually there. Thus, the output of block 220 is finding a predicted user position for a future moment which is precisely when the display system may be generating a visual frame which contains that positional representation. As these display systems have pre-designated target frame rates, the precise target timing for display of these frames is known in advance and this guides the system as to how much time into the future it may be predicting. The data flow diagram 200 includes a block 222 for real-time interpolation. Block 222 may generate display frames that are not in synch with input frames coming from the sensors. For example, the Microsoft Kinect samples at 30 hz while high end VR display systems display at 90 fps (Note that when discussing sampling, the unit "hz" may be used, which means "times per second". When discussing display the unit "fps" or "frames per second" may be used. These units may be interchangeably used in this disclosure). In an example, to display positional representations at that rate while only sampling at 30 hz, block 222 may generate time targets which are in between the frame timing of the Kinect sensors. A process may include adjusting the time parameter that defines the target display time on the latency reduction module to produce frames at a higher rate than the sensors are operating.

The process from block 202 to 204 may be used to represent the path from depth sensor inference data to production of a reference model which is used in subsequent processing. Particularly, an operation that is the same whether on the first iteration of the system or on subsequent iterations. The process among blocks 204, 206, and 208 represent steps that occur in the process that are used on the first iteration of the production of a reference model or subsequent iterations. In an example, the input to the part of the process (202 to 204) may be modified by the below process among blocks 204, 210, 212, and 208 for reference model productions after the first one (e.g., iterations).

The process among blocks 204, 210, 212, and 208 may take the smoothed depth sensor skeletal inference data and the current iteration of the reference model as input, and processes them together to produce more strongly statistically constrained trajectories for greater accuracy.

The process among blocks 208, 214, 216, 218, 220, and 222 may leverage the existence of a previously produced reference model to produce visuals at run time for a user who may benefit from richer feedback about their motion or timely information about what that motion may be. The process among blocks 202, 204, 206, 208, 210, 212 may be used when developing an accurate reference model in a delayed-processing mode (pre-processing). The process among blocks 208, 214, 216, 218, 220, 222 may be used when creating visual representations for the user at runtime (real-time).

Figure 3A:
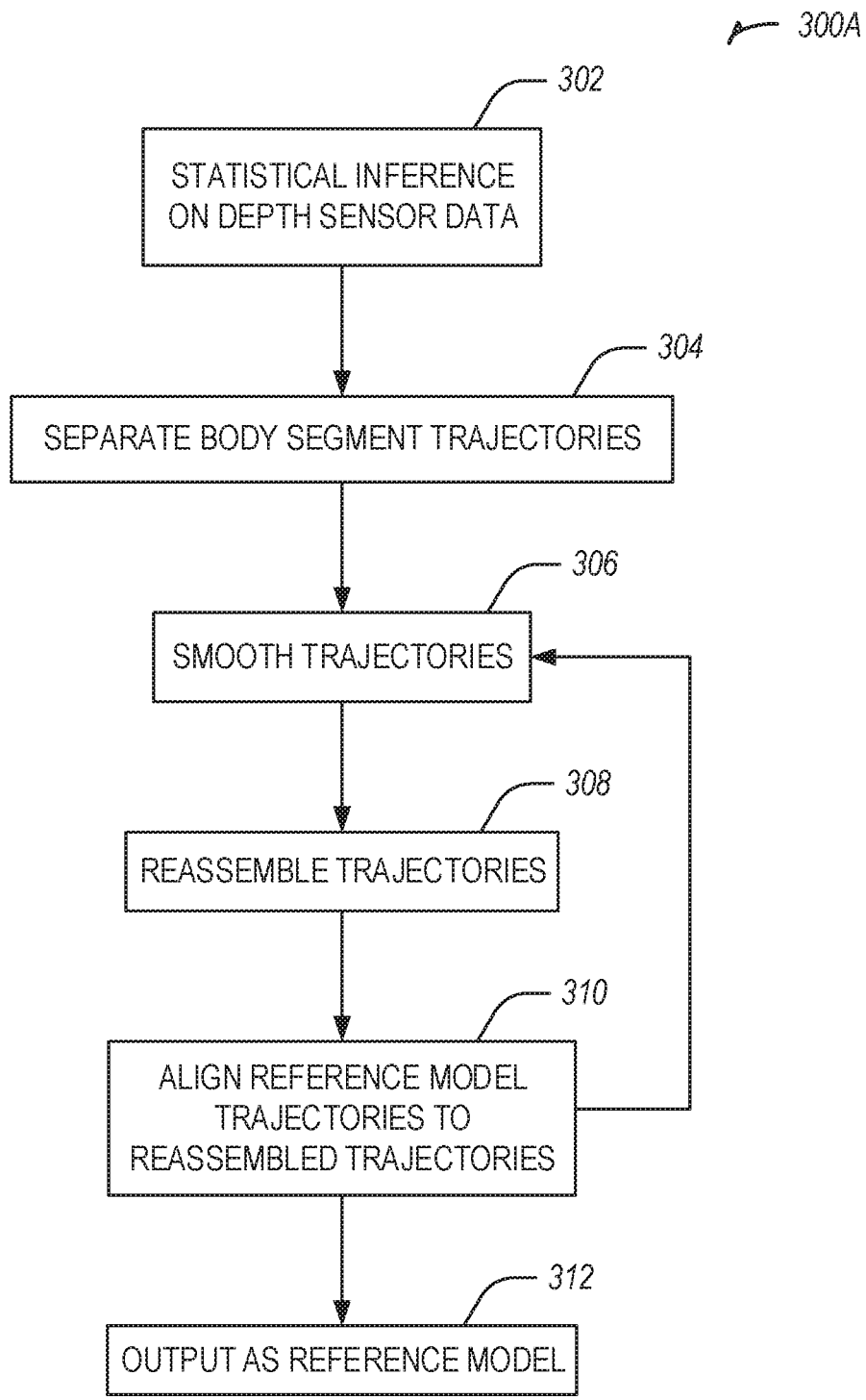
FIGS. 3A-3C illustrate smoothing processes and examples for post processing trajectories in accordance with some examples.
Figure 3B:
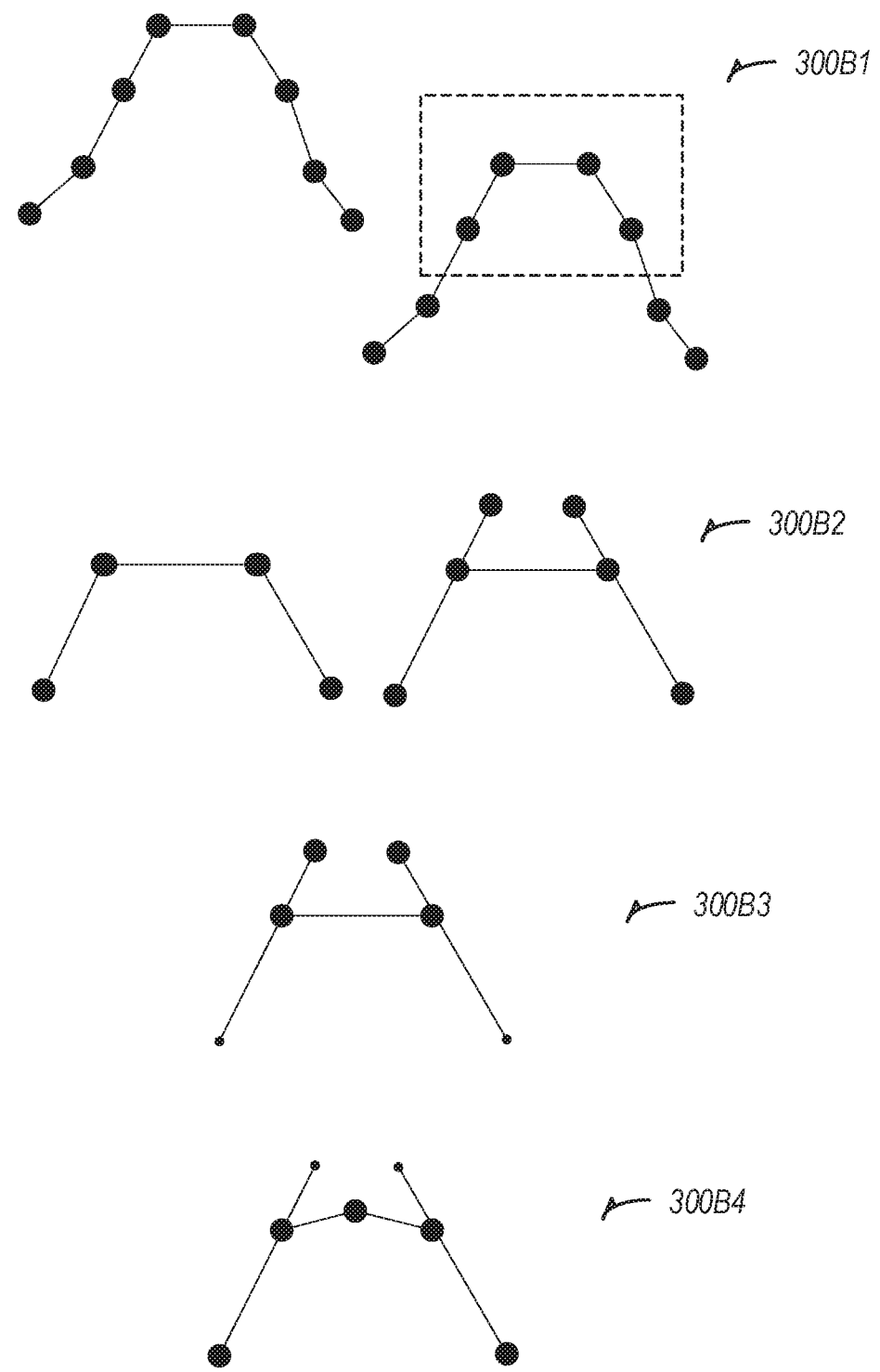
Figure 3C:
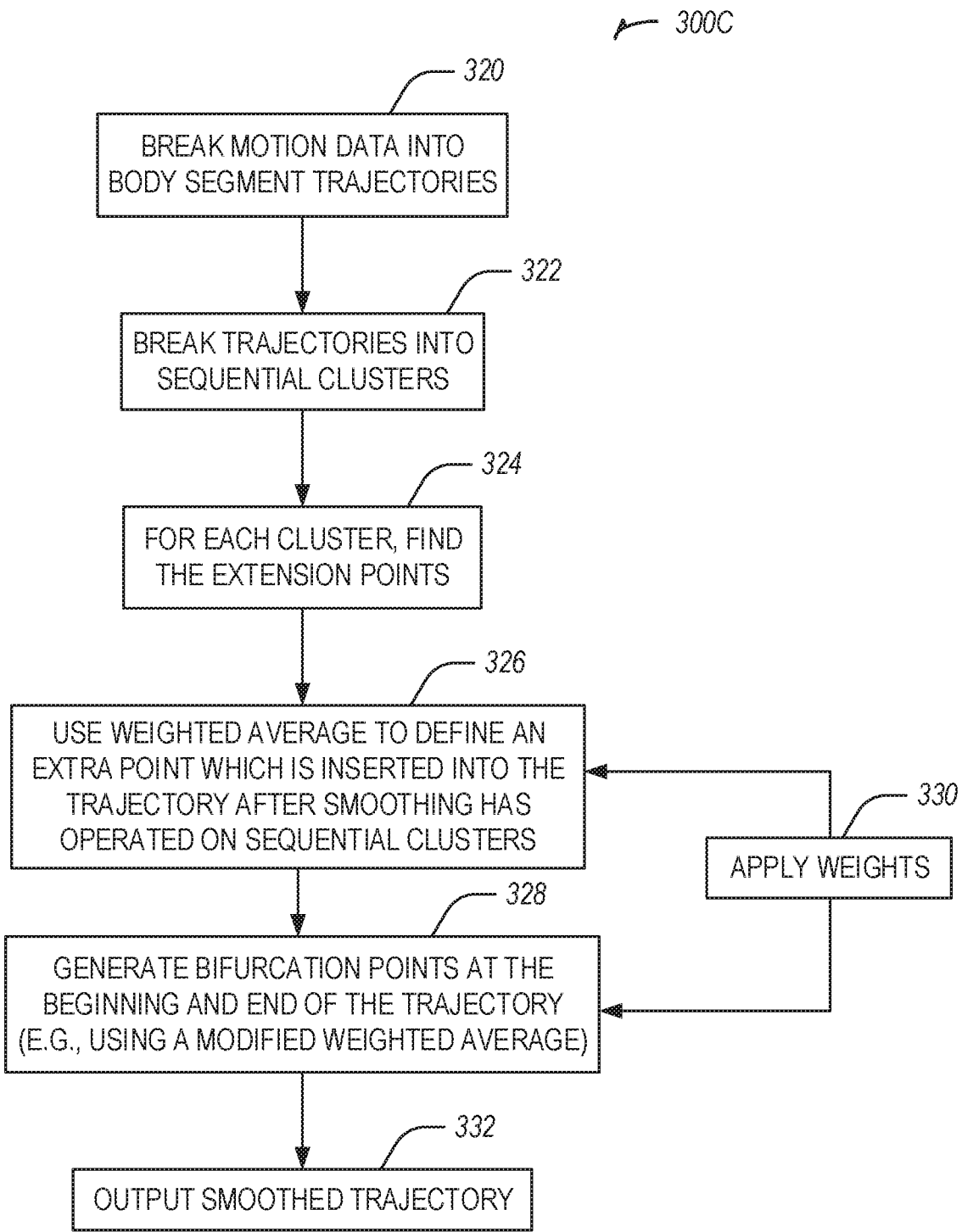

FIGS. 3A-3C illustrate smoothing processes and examples for post processing trajectories in accordance with some examples.

FIG. 3A illustrates a flowchart showing a process 300A for post processing trajectories. The process 300A includes an operation 302 for performing statistical inference on position sensor data, such as from a depth sensor or a 3D position sensor (e.g., local positioning sensor). Position sensor inferences of human skeletal locations may be noisy measurements. Position sensor inferences may include statistical data points where point-like inferred locations for specific body segments surround the actual trajectory that the segment in question traversed.

The process 300A includes an operation 304 for separating body segment trajectories. In an example, only the series of 3-dimensional coordinate positions of a single body segment at a time are considered. In another example, the various series of the same type for all of the body segments that comprise a motion model are used. In the first case, individual body segment trajectories may be processed one at a time. When this is done for all body segments then the whole motion model has been processed. In an example, with a pre-made trajectory for each body segment for a given technique, the curve of the trajectory may be roughly the same in overall quality for all competent users. In an example, the scale of the curve may vary among users, or the start and stop points for discrete movements may vary between individuals.

In order to manage both scale and end point mismatch, the process 300A may be used to first generate a rough trajectory from the depth sensor data. After that, process 300A may be used to execute calculations on the rough trajectory to modify and fit a pre-fabricated trajectory to the rough trajectory.

The first step in constructing a rough trajectory is to break the time series of depth-sensor-inference-delivered body segment locations into sequential subsets or containing three each. These are "sequential clusters" of three points. The three points may make up a moving window. For example, taking the points in series, the first, second, and third points may be one such sequential cluster, the second, third, and fourth may be another, and so on.

Fitting a line segment to each sequential cluster: each cluster may then have a line segment fitted to them.

This may be a least squares regression on the three points. This may be overly computationally expensive and not of sufficient benefit, so a simpler method may be used.

In an example, fitting a line segment to the sequential cluster may instead involve first calculating a "center of mass" location (average position among the points) for the three points to serve as a center point. Then process 300A may be used to calculate the direction of the line segment between the two end points in the set of three depth sensor inferences and creating a line segment through the center point that has that direction. Calculating this direction may involve finding the direction of the vector which points from the first to the third point in the cluster.

A final correction (which may be applied when calculating the average of the three points to determine the center point in the first place) is to hold this line segment toward the outside of the curve by weighting the central depth sensor reading point highest when calculating this "center of mass" average. The proper weighting may be something like 1,3,1 where those are ordered to match the time order of the cluster comprising three points. The final step in calculating the average may then be to divide not by the number of points, but instead by the sum of the weights (as in a standard weighted average). The more the line segment is to be held toward the outside of the curve, the larger the middle weight may be compared to the two outer ones. The precise optimal weighting may be ironed out in testing the software and adjusting.

These line segments may be strictly centered on the established center point and their total length may be half of the average distance between the line segments connecting the first and second point and the line segment connecting the second and third such point in the set of three depth sensor points. This distance may make it easy to connect all such line segments together once all of them have been found for the trajectory. If vectors a, b, and c represent the depth sensor reading point locations, then this length is $(abs(c-b)+abs(b-a))/4$. "abs" means "absolute value" or magnitude.

Trajectories are not necessarily closed paths and this means they have start points and end points that are not the same point. In fact, it may only be special cases in human movement where they are closed paths. In the case of closed paths, the method above may work for all points in the trajectory because they may all have neighbors in the time series. As a result, in examples where the trajectory is not a closed path, a different method is used, to leverage the points that are available. In this example, the end points may be connected to the end of the nearest line segments found in the above process to create the start and end line segments.

After this set of line segments is established, they may not produce a continuous path (e.g., if the length of these segments is made longer, they may connect, in a special case). In an example, line segments have been kept to a length such that the gaps between the ends of each can be filled just by connecting their nearest ends (e.g., usually nearest in space, and using the nearest in the time series results in the right connection) and such that the full series of line segments results in a fairly smooth trajectory relative to other options for the length of inferred line segments.

The process 300A includes an operation 306 for smoothing of trajectories.

Operation 306 may be used to smooth the previously generated curve out. Despite the inference method being designed to output a smooth trajectory, more smoothness may be desired.

This is done by turning each line segment into two new line segments which bow out slightly in the average direction that the line segment's two nearest neighbors project out to if extended in the direction of this central line segment. For example, to consider a closed path, if done for all sides of a square, it may turn the square into an octagon. In an example, it may turn it into a perfectly regular octagon. In an example, the central point of each side of a square is pushed out just the right distance such that the now eight points, if connected by line segments results in a perfectly regular octagon with all sides and angles being equal. The process described below is based on a weighted average concept. That weighted average finds these points for all regular polygons using dynamic weighing, which is discussed below in the advanced smoothing section.

"Sequential clusters" processes may be repeated here. In order to execute smoothing, the trajectory generated in the previous step may be used by breaking it into sequential clusters of four points each. This set of four points then may contain three line segments. These may be the central line segment (between the two points toward the center of the cluster) and its two neighbors.

Extend by half—$((V_B-V_A)/2)+V_B=EV_{BA}$ and $((V_C-V_D)/2)+V_C=EV_{CD}$ Where, $V_n$ is the vector representation of a point on the trajectory and $EV_{NM}$ is the vector representation of the "extension point" of a line segment between two points in the trajectory. The two line segments that get extended are the two line segments that are neighbors of the central line segment. The central line segment may be bifurcated into two smaller line segment by adding a point in the middle that is not actually on the line segment. To find this point, points that extend the neighboring line segments by half in the direction of the central line segment may be used. Here, $V_B$ and $V_C$ are sequentially the second and third points in the cluster and $V_A$ and $V_D$ are the first and fourth points in the cluster. In an example, the operations defined by the equation are the vector analogs of numerical calculations using standard mathematical definitions thereof and this carries through for vector operations for the present systems and processes unless otherwise specified.

BP (referenced below) is the new "bifurcation point" which is the new point this whole process is designed to find. It is designed to add a new point to the trajectory which is both approximately (very close) on the trajectory and near the center point of the line segment which is being bifurcated.

Weighted average—$(EV_{BA}+3V_B+3V_C+EV_{CD})/8=BP$— BP is "bifurcation point" and is the defining point by which process 300A may be used to break the old line segment into two new ones which are bowed out. Alternatives to 1,3,3,1 (coefficients or "weights" in the weighted average) are easily applied and can affect the preservation of curvature at the original line-segment ends.

Dynamic weighted average—instead of having a pre-set weight scheme for all of these calculations to find the new point, process 300A may use the naturally paired points (extension points for the two neighboring line segments being one pair and end points for the central line segment as another pair) and calculating the distances between the points in each pair. These distances may be the basis for the weighting given to that pair when the weighted average is calculated. The equation routine that defines that weighting is given in the advanced smoothing section.

The process 300A may be used to account for the line segments on the ends of the series. Here process 300A may use a different weighting scheme. Because only one neighbor may be extended, it is given a greater influence. So does the end point because there is less influence in that direction without its extended point. A scheme such as 4,3,2 where 4 is the weight for the point on the end of the sequence, 3 is for this line segment's neighbor's extension point, and 2 is for the line segment's second point which is toward the interior of the sequence. So the equation may be $(4V_A+3EV_{BC}+2V_B)/9=BP$ (Where points a, b, and c represent a sequential cluster of three points on the end of the trajectory.

Here there are not four points available because there is only one point in the trajectory that exists on the exterior side of the "central" line segment). Other weighting schemes that keep this quality of having the end-point of the series weighted highest, the extension point of the neighbor line segment second highest, and the central line segment's interior most point weighted the lowest may be used, for example, as long as the weights aren't very different in value relative to one another. In an example, $EV_{BC}$ is the result of vector subtraction of the interior most point of the three "c" from the middle point "b" with "a" being one of the end points of full set of points in the trajectory.

The process 300A includes an operation 308 for reassembly of trajectories and optional output (in first iteration this is where the algorithm stops because it has no reference model with which to perform the rest).

The next step in updating the user avatar with new data is to make each trajectory of the previous avatar align with the newly formed trajectory from the new user data. This full process may be done independently for all trajectories and sub-trajectories before recombining trajectories into a full motion model.

The first step is to rescale the trajectory from the previous avatar.

Circles scale based on the radius. The curvature of a circle scales based on the reciprocal of the radius.

In an example, the reciprocal of the curvature can be used as a scaling factor for a curved trajectory to make the two have the same scale characteristic overall (though not precisely in any local portion of the two trajectories).

Curvature is a property of continuous curves and not discrete series of connected line segments (as in the trajectories) and process 300A may use the delta delta of those trajectories. This may include executing the "delta" operation twice. The first time applying the delta operation involves subtracting vectors specifying the positions of neighboring points in the trajectory from one another where the prior one is subtracted from the latter one. The second execution of the delta operation is doing the analogous subtraction but now using the output from the previous delta operation.

The result is many delta deltas for the full sequence of both trajectories. Scaling the previous user avatar's trajectory may be done with some form of an average over these. In an example, the local irregularities of the new user data may have their impact diminished by redefining the delta delta type calculations to involve first-step delta calculations (the delta that operates on position data directly as opposed to operating on the output delta data that comes from this first step) between more distant points as opposed to direct neighbors in the time-series. The exact time-series span to utilize may depend on the distance covered in the trajectory as larger paths may be less sensitive to depth sensor noise for this calculation. Optionally the calculation may be done on portions of a trajectory in the top x % of speed represented in the time series (calculated as the deltas between neighboring points in the time series). This may diminish the effect of depth sensor noise as well. The precise percentage to use may be a parameter that it tuned during testing of implementations.

With the average delta delta values calculated from the trajectory distilled from the user data and the average delta delta values calculated in advance from the previous avatar, process 300A may be used to scale the previous avatar. To do this, each of the vectors which represent points in the trajectory from the previous avatar is multiplied by the average delta delta from the user data and divided by the average delta delta from the previous avatar.

In an example, analogous portions are used of the two trajectories for all calculations. This may include sampling between ranges of each trajectory which are analogous to one another.

In another example, the entire motion model of the reference model may be scaled at once by calculating a global curvature ratio across all trajectories in both the reference model and the new user data by averaging the ratio for each body segment's trajectory. This may lead to some trajectories that are a poor match between the two.

In another example, scaling may be achieved just by measuring the dimensions of the two users. This is another way to scale the entire motion model of the reference model all at once.

In another example, it may be assumed that because it is the same user (in the case where the reference model is indeed the previous user avatar and not an expert model) that scaling is unnecessary. This is a reasonable assumption for fully grown users or for youth who had their previous avatar captured recently.

Center of mass alignment may include an optional first approximation. The option al first approximation includes moving the starting point for the trajectory from the new user data to the location of the starting point of the previous user avatar's trajectory translating the entire trajectory from the new user data along with its starting point.

A second approximation may include minimizing the sum of the distances from the points on the trajectory from the new user data to the nearest points on the trajectory from the previous user avatar. In order to minimize this sum, the center of mass of each trajectory may be calculated. Then the vector that defines the location of the center of mass of the reference model trajectory may be subtracted from the vector that represents the center of mass of the new user data trajectory. Add this vector to all points in the reference model trajectory translating it over onto the space that contains the new user data trajectory.

A third approximation may include breaking the trajectories into n sequential clusters labeling each with their order relative to each other in each trajectory's time series. Calculate the center of mass of each cluster. Calculate all the vectors that define the distance and direction from all clusters in the reference model trajectory to their analogous clusters in the new user data trajectory. Average these vectors. Add the averaged vector to the reference model trajectory to get better alignment.

A fourth approximation may include repeating the method used in the third approximation but with m sequential clusters (such that m>n).

The technique may continue with successively improved approximations using greater numbers of clusters for a certain number of iterations or, to be more efficient, do it until the magnitude of the averaged vector that may be added to the reference model trajectory drops below a certain threshold. To be computationally efficient with this process, it may be useful to have an initial n-value near 4 or 5 and iterations after that using a value that adds 2 or 3 to it each time. This way a minimal number of cluster center of masses and averaged vectors are calculated up front so that if it does converge quickly the system may not have computed a huge number of these when it was unnecessary.

Planar alignment may include triple dimension reduction analysis for co-planarization.

Planar alignment may include using a plane that best fits each of the trajectories and that process 300A may be used to orient these planes with one another such that the trajectories associated to these planes translate and rotate with them when those planes are made to orient together. The result is a good alignment of trajectories. In an example, these are trajectories in 3D space so there is no requirement that any plane may fit the data well, but this doesn't prevent a plane from existing which is a better fit than all other planes (it may minimize Euclidian distance from the points in the trajectory to said plane compared to all other planes). Process 300A may be used to execute operations that may roughly align the planes as if they were found, rather than actually finding these planes for comparison.

The approach for process 300A may be to consider two coordinates at a time in calculating three components which together create a rotation within a plane consisting of those two coordinates. When positioning things in 3D space, there may be three components to an "ordered triple" that defines a location. Those components may then be coordinates. In an example, the word "components" is used with the description of this process as including one or more of:

A direction unit vector—this defines the direction that each point may move within the two-coordinate space (although some points may move in the negative of that direction)

A "zero point"—a point in the time series where there may be no movement (where the direction unit vector may be scaled to zero)

A scaling function—this outputs the distance in the direction of the direction unit vector that all points may move The combination of these three components creates a set of vectors that may rotate each trajectory's representation in the two coordinate plane on which they operate without affecting it in the direction defined by the omitted coordinate. In an example, one of the three coordinates may be dropped for all positions in specified in both of the trajectories create simplified trajectories in a "truncated parameter space" (e.g. (x,y,z) becomes (x,y), (x,z) or (y,z)). It may be the case that all three combinations are used to find "rotation vectors" in the full (x,y,z) space. Doing this may require adding the resulting (x,y), (x,z), and (y,z) vectors together in the following way $(x_1,y_1,0)+(x_2,0,z_1)+(0,y_2,z_2)$ for each point and then dividing the resulting three parameter vector by 2. In another example, it may be the case that it is only done twice, say for $(x_1,y)$ and $(x_2,z)$ and then dividing the x result by two as in $((x_1+x_2)/2,y,z)$.

The pertinent question then becomes how to find the two-parameter vectors used in either case to generate the 3D rotation vectors that may ultimately be added to the already center-of-mass-aligned reference model trajectory thus rotating it to an on-plane position with the new user data trajectory.

The process 300A may be used to first find the direction unit vector. To do this, process 300A may be used to take the average of specific set of vectors which may be calculated based on finding distances between points in the two trajectories (the operation that defines this calculation is given below) and divide by the absolute value of the averaged vector. When this averaged vector is (0,0) then process 300A may include recalculating throwing out one of the data points. Choosing which one to throw out may be arbitrary in trying to avoid the average vector being (0,0) and process 300A may include selecting one, such as the first in the series. The critical thing is simply to avoid dividing by zero.

To do this delta vector calculation step efficiently including finding the nearest point in the new user data trajectory to the center-of-mass-aligned reference model trajectory, process 300A may be used to narrow the search space for the "nearest" reference model point in the new user data trajectory. The process 300A may be used to seek a match for the points of the previous user avatar's trajectory in sequence starting with its first point in the time series. For example, starting by matching up the first point in the previous user avatar's trajectory with the first point and second point in the new user data trajectory and choosing the shorter vector may be an initial operation. Then process 300A may include move on to the second point in the reference model's trajectory matching it up with the point from the new user data trajectory chosen previously as well as that point plus one time step and that point plus two time steps, again, choosing the shortest vector. This same rule may be applied throughout the full time series of the reference model's trajectory. In an example, when the final point in the new user data trajectory's time series is reached, and used twice the analysis may stop there and the next step may be run with the matches made and stored to calculate the delta vectors. Then, with each match, subtract the vectors representing the points from the reference model trajectory from the vectors representing the new user data trajectory. In an example, the series of delta vectors generated by this process thus constitutes the set of delta vectors used to calculate the average vector.

Next, for each of the delta vectors, process 300A may be used to calculate their magnitude. The process 300A may be used to map representations of each of these vectors onto a 2-D plane and to fit a line to the resulting data points. This data set may be called the "time-indexed data". The data points here consist of two coordinates where the x-value is the time-value for the point in the reference model's trajectory ("sample time") which each delta vector is associated with and the y-value is the magnitude of the delta vector Fit a line to this set of data using the least squares method or similar. If iterating process 300A multiple times to approach on-plane alignment between the reference model trajectory and the new user data through a series of approximations, least sum distance may be good enough and offer better computational efficiency. The result may be a line governed by the equation $y=mx+b$.

Then process 300A may be used to shift the line so it passes through (0,0). To do this, the process 300A may be used to find the x-value which sets the output of the $y=mx+b$ to zero. This is given by $x=(y-b)/m$ if the y-value is set to 0. This means the x-value is $x=-b/m$.

In an example, whichever data point is now closest to the x-value in the equation is the "zero point". To move this zero point close to the origin, process 300A may be used to subtract as follows. If its (x,y) value is (m,n) then a vector of (m,0) may be subtracted away leaving a vector (0,n). This same vector may be subtracted from all of these data points resulting in a shifting of the whole data set leftward a distance of m. In this case, the x value represented the time index of the point in the trajectory, so shifting it left a distance of m results in a modified time index.

The next step is to do a similar analysis on a new set of data points, called the "zero-point-distance-indexed data". Zero-point-distance-indexed data is created with the x-value being the distance in the coordinate space of the original reference model trajectory (remember within this phase of the analysis, one of the three coordinates has factored out and given values of "0", so this distance is the Euclidian distance calculated from only the other two coordinate values) from the zero point and the y-value still being the vector magnitude.

In an example, for process 300A, the effect of "negative distance" may be created by having points on one side of the zero point having different sign (positive vs. negative) from points on the other side of the zero point. To do this, the zero-point-distance-indexed data is further modified in the following way. The x-value of this set (distance from the zero point) may be multiplied by the shifted x-value from the associated point in the previous data set divided by the absolute value of the shifted x-value from the same associated point in the previous data set. The effect to modify the distance values for the points before (in the original time series) the zero point such that they become the negative of the distance to the zero point while keeping those distance values the same for points after the zero point. This allows use of the negative direction of the direction unit vector for the points that use it (e.g., the ones close to the zero point) and the positive direction of the direction unit vector for the points after the zero point.

Now, process 300A may be used to fit a line to this zero-point-distance-indexed data where the line outputs the proper multiplicand for the direction unit vector the point in the reference model's 2-D trajectory's position in space relative to the zero point. This line may also have the form $y=mx+b$.

Then, to get the "rotated" output of this process, use the equation for this line to calculate the multiplicand for the direction unit vector for each point in the 2-D version of the reference model trajectory by using each point's distance and positive or negative time-series position as x-value input to the line generated for this purpose. Each of these may be associated to their original time index so it can be easily understood which points in the reference model trajectory they are to be added to.

Then, store the vector for each point that is the result of the multiplicand and the direction unit vector. These vectors may be added to the original-time-index-matched vectors that are generated in performing this process through again with the other coordinates in the 3-D coordinate space omitted. As described above, if doing this three times (one time each for the x, y, and z) the sum of the three original-time-index-matched vectors may be divided by 2. Or if just doing it twice, the coordinate that gets duplicated may have its values averaged in the sum. Alternatively, one of the two values from the duplicated coordinate value calculation can be simply be thrown out and the other one used. Doing the analysis through only twice instead of 3 times may be slightly less accurate but uses only $\frac{2}{3}$ as much computation.

Then process 300A may be used to add this final vector to its associated (original-time-index-matched) vector which represents each point in the reference model's full 3-D trajectory to get the new, aligned trajectory.

Either way, for more accuracy, for example, running this planar alignment one time through can be treated as a first approximation. Additional iterations may converge to perfect alignment.

Time apportionment may include choosing a series of points along the smoothed trajectory such that the trajectory can be displayed as if it was captured at an arbitrary rate of frames per second. In an example, frames per second is a global standard for a motion model, meaning all body segment trajectories mush have the same frame rate in order to be reconstructed into a time series of body positions in the end. In an example, each body segment may have different frame rates that do not align (at least not in the majority of pairwise cases) and some global output frame rate may be targeted. In this case, interpolation methods may be used to find positions between the stored frame position values for all body segments where these interpolated positions line up with targeted frame times. This may properly define positions of all body segments at all the times needed for each frame.

Building on this, in an example, the process may be done for an arbitrary motion model given presently established in the art interpolation methods, and the output frame rate may match the frame rate that the new user data was captured at with the depth sensor. This may be useful for taking motion models that have smoothed trajectories which adds an exponential number of points to the trajectory (the number of points roughly doubles each smoothing iteration) and reducing it to only on-frame points which lie on the trajectory.

For example, time apportionment may preserve the relative distances between points which is representative of the velocity at each part of the trajectory.

The approach is to create a time series of the magnitude of the delta vectors between adjacent points in the depth sensor data and divide each by the sum of all of these delta vectors. This gives the proportion of the total distance covered that was covered in the time between each frame. Then each of these proportions is multiplied by the total distance of the smoothed trajectory received from all of the previous processing steps. Points are then chosen starting with the beginning of the time series and working toward the end such that each is the distance from the previous as assigned by the distances calculated in the previous steps. These new points constitute the output time series of positions for the body segment in question form the time apportionment process. The analogous process can be used to create matching frames between the new user data and reference model trajectories of the same body segment.

A more complex, but possibly useful revision of this may include trying to quantify progress in the direction of the hypothetical tangent to the continuous representation of the trajectory at center point between each pair of adjacent data points in the original depth sensor data as opposed to the magnitude of the direct delta of the adjacent points.

This can be done for the interior in the time series because it uses neighbors. In an example, the first and last deltas of may be calculated in the way described above since the tangent-based method may be unavailable.

In an example, the interior deltas may be calculated as follows. First, the time series of deltas may be calculated. Then a time series of what we'll call retrograde 3-gap deltas may be calculated. These are calculated by subtracting a vector representing each point in the series (until the last three) from the vector representing the point three points forward in the time series for each. These 3-gap deltas may be representative of the general trajectory direction over that three-delta series in the trajectory. In an example, a larger portion of trajectory is less susceptible to misrepresentation of the direction as the basic delta if indeed the measured data is noisy. The time series of the deltas and 3-gap deltas may have the same number of deltas if the first and last deltas are removed. The remaining time series in both may then be matched up in order. The 3-gap deltas are then divided by their magnitude to give a 3-gap delta direction unit vector. Then dot products may be calculated between the deltas and their paired 3-gap delta direction unit vectors which gives the distance in the direction of the 3-gap delta direction unit vector that the delta vector covered. We'll call the result "progress vectors".

The resulting time series of progress vectors along with the first and last delta vectors that were calculated the simpler way may have their magnitudes calculated and summed. Then individual vector magnitudes divided by the sum to get a time series of percentages of progress through the trajectory. Then this is applied to the new trajectory to get the points for the new trajectory time series.

The process 300A includes an operation 310 for aligning previous reference model trajectories to smoothed trajectories. Operation 310 may include iterating operations 306-310 for denser inference (e.g., inference based on new data and reference model data resulting in a form of a combination). For example, operation 306 may be repeated to apply smoothing again. Operation 308 may be repeated to reassemble trajectories again.

Denser statistical inference may include redoing the task of fitting a line segment to each time-series-sequential cluster of three points in the new depth sensor data specific to a certain body segment. In this case there are two parallel routines that eventually come together to position the line segment. One of these is to generate a line segment following the procedure already used (or, indeed stored from when it had been done the first time around, making this a look-up task). The second is to generate a line segment specific to the previous user avatar trajectory. As described below, the two are then averaged in order to generate a final line segment which may be fed into the rest of the process, which, as described above in the description of normal statistical inference of trajectories turns these line segments into a trajectory.

The process 300A may start by assigning a sequential cluster of three points (reminder, a sequential cluster is a number of sequential points) in the new user data trajectory such that there is a minimized difference in position between a central new depth sensor data point and the central point in a sequential cluster in the reference model trajectory. This may be done for each interior point in the time-series of the new depth sensor data. Both trajectories may utilize sequential clusters of three points for forthcoming steps in the process and the key is that these are matched up in space as defined above. These clusters are comprised by a central point which is the "interior" point (in this case, "interior" is speaking to interior to the full trajectory, while "central" is central to a sequential cluster within a trajectory and each interior point has a sequential cluster of which it is the central point) itself, the point temporally immediately before, and the point temporally immediately after within said trajectory.

To efficiently find assignments for each interior point in the new depth sensor data set, after an initial provisional assignment based on moving one point forward in the time series for both data sets from the assignment used for the previous cluster in the time series during their line segment fitting, process 300A may progressively check if a better neighboring assignment leads to reduced distance between the center (average point) of the two clusters. If a reassignment to a neighbor reduces this distance for central points in a cluster of these interior points, then the reassignment may be made. Then process 300A may check again and repeat the process until no local reassignment reduces this distance. At this point, the assignment is final and process 300A may be used to progress forward one temporal step in each data set until all interior points in the new depth sensor data is exhausted.

In an example, when there is no previous assignment, then it may be the second point (first interior point) in the time series for both data sets which may be used as the first assignment.

In an example, the process 300A may use the same center point as used for creating the line segment specific to the new depth sensor data, but now run two analyses in parallel and average them.

First: find the weighted average of the three assigned new depth sensor data points. As before the central point in the cluster of three may have the highest weight which may hold the line segment to the outside of the curvature of the implied trajectory that the data set represents. This gets this point close enough such that the smoothing algorithm may pull it onto the real trajectory.

Second: find the weighted average of the three assigned previous user avatar trajectory points. As before, the central point in the cluster of three may have the highest weight.

Third: average these final two points. This average may have dynamic weighting. In lower velocity portions of the trajectory, the new depth sensor data may have a higher weight and in higher velocity portions they may have equal weight or the previous user avatar trajectory data may have higher weight.

To this point, the two clusters of three points are used to position the central point of a line segment, the full series of which may be the initial scaffolding of the ultimate trajectory. Now the two clusters of three points may be used to set the direction of the line segment while preserving the position of the central point. In an example, the central points of matched clusters are not averaged and instead the central points from the new user data may be used as the center points for these line segments. For example, this may be more computationally efficient given limited gain from executing the full averaging method of the two types. Additionally, using the new depth sensor data may give more consistent spacing between these points in terms of how well it maps to the relative velocities seen in the users motion.

An example technique may include, for the new depth sensor data, this is done as in advance which is explained in "fitting a line segment to each sequential cluster" (under the first and second "description of general scheme for post processing modeling For the reference model trajectory, a first vector may be created, which may be treated as a line segment. There is a chronological order to the points in the sequential cluster, a 1st, a 2nd, and a 3rd. The delta vectors between all three pairs may be determined. This means there is a vector that is the 1st to 2nd vector, a 2nd to 3rd vector and a 1st to 3rd vector.

Step one is to compare the 1st to 2nd vector's magnitude to the 2nd to 3rd vector's magnitude. This comparison determines which points we'll average to create a new "direction vector" which may then become a line segment. If the 1st to 2nd vector and 2nd to 3rd vectors are equal in magnitude, then the 1st to 3rd vector may become a direction vector. If the 1st to 2nd vector is shorter than the 2nd to 3rd vector then a weighted average of the 1st and 2nd points in the cluster may be the starting point of the direction vector and the 3rd point in the cluster may be the end point. If the 1st to 2nd vector is longer than the 2nd to 3rd vector then a weighted average of the 2nd and 3rd points in the cluster may be the ending point of the direction vector and the 1st point in the cluster may be the starting point.

The weighting for the averaging may be as follows. In whichever case, the 1st or 3rd points may have a weight of 1. The 2nd point's weight may be given by the absolute value of the magnitude of the 1st to 2nd delta minus the magnitude of the 2nd to 3rd delta. This may all be divided by the magnitude of the 1st to 3rd delta. In this concept, the closer to equal the 1st to 2nd delta and the 2nd to 3rd delta are, the lower the weight of the 2nd point in determining the direction of the direction vector.

This direction vector and the one from the new user data are then scaled to a quarter of the length of the average of the length of the two line segments (the one from the first to the second point in their cluster and the one from the second to the third point in their cluster) in the present sequential clusters for each. If they are in opposing directions to one another (testable by seeing if the cross product is positive or negative) one of the vectors may by multiplied by −1 in order to orient them together. The two vectors are then averaged giving a composite vector. This composite vector is then attached to the established center point by moving the "tail" or starting point of the vector to that center point (in normal Cartesian representation, a vector's staring point is placed at the origin and its tip is placed at the point indexed by the vectors components values treated as Cartesian coordinates). This composite vector is then copied and reflected across this starting point. Finally, the end points of the two vectors (the vector and its reflected vector) where both are attached to the starting point are used as the end points of a line segment. This becomes the line segment assigned to the center point of this particular sequential cluster.

This method of creating a line segment from a vector determined by a weighted average of the three points in a sequential cluster may work well regardless of whether the central point was determined only by the new user data or if both new user data and reference model data are used. In an example, zero, one, or both of the new user data and reference model data sequential clusters may have line segments fitted to them using the weighted average of the three points to give the 2nd point in the cluster some weight if it is not in equidistant from the other two points as described above.

An example technique may include, for both clusters, a simple 1st to 3rd delta is used as a direction vector and then these are averaged using the same dynamic weighting as was used to position the central point (which may be velocity dependent). Finally the central point of this line segment may be positioned at previously found center point for this new user data cluster as opposed to adding in the extra work of averaging with a center point from the reference model trajectory's cluster.

An example technique may include, using the same system as a technique described above, but performing the technique twice. Once for the previous user avatar trajectory cluster with the center point closest to the new depth sensor data cluster's center point and then again for the 2nd closest previous user avatar trajectory (these two may be sequential). Then all three are averaged. Weighting may be assigned by how close the central point in the reference model trajectory's cluster which the line segment to be averaged is based on is to the central point in the new depth sensor data cluster. Zero distance may give a weight of 1. For example, for both of the two reference model trajectory sequential clusters, the weight may be the distance from the new user data trajectory cluster's central point to the other reference model trajectory cluster's central point divided by the sum of the two distances from the reference model trajectory clusters' two central points to the new depth sensor data central point. This makes sure that the closest reference model trajectory cluster has the most influence with that influence scaling based on the relative closeness of the two clusters.

For both cases where an average of the influence of the two trajectories' clusters may be used (finding the central point and finding the line segment direction) the dynamic average scheme uses velocity as the key input. High velocity portions of the trajectories are intended to give more weight to the new user trajectory. To generate weights, a function which may take as a configuration parameter the maximum distance between two sequential new depth sensor points in the given trajectory may assign the weights to meet these requirements.

It may do this by calculating all of the deltas between sequential points in the series, finding the maximum, and multiplying that by two. Then, for all clusters in the trajectory, divide the sum of the two deltas adjacent to the central point (deltas created by calculating the distance between adjacent points in the cluster) by that maximum delta multiplied by two. For the end points, it may be the one adjacent delta divided by the maximum delta (not multiplied by two).

These weights may be applied to the line segments generated by the reference model trajectory clusters based on which new user data cluster each was matched to. The new depth sensor data line segments may all receive the highest weight when averaging.

This gives the depth sensors the most assistance from the previous avatar trajectory when it is producing the sparsest data which is when velocity is high. If a method is used where no line segment has been generated from the previous user avatar trajectory, then process 300A may just pass the line segment from the new depth sensor data through to the next step.

When the full series of line segments has been assigned to all of the interior points in the time series with the contribution both data sets, this set of line segments is the final assignment. Then adjacent line segments (in the time series) are connected end point of the previous one to the start point of the next to create a connected path which can be called a "proto-trajectory".

After connecting all line segments, execute "smooth" enough times to get the trajectory and then do time apportionment to get to the right frame rate.

Iterate the full process again with product as new reference model and with new data captured from user if a better representation is to be used (or when the user returns to update their avatar).

Creating a first user avatar from expert model may include using an expert model (e.g., a quantified model of the technique taken from a highly trained expert in the motion) as a previous user avatar.

In an example, the match from the expert model to the new depth sensor data is much worse than that match may be for a previous user avatar. This makes, scaling, translating, and rotating methods more significant and may force multiple iterations of them. This may include piecewise scaling where specific portions of the reference model are scaled differently than others but where adjacent endpoints between these parts preserve their directional orientation relative to one another and have their distance between the scaled with a value similar to the scaling of the chronologically first part, the chronologically second part, or a mix of the two values.

It also may iterate the process over several sets of new depth sensor data in sequence. They may be used pairwise with one of the sets of new user data standing in as the reference model. Then, the output of that full process applied to one reference model data set. It may rely on 5 or more iterations of pairwise use of new depth sensor data before the final output is of sufficient quality to call it a first user avatar. And, the weight given to the new user data relative to the reference model may scale with the number of iterations of new-user-data-only inference in that case. In an example, multiple different new user data sets may be used to leverage statistical convergence to the mean. The same new user data may not be used multiple times as the result may be the same motion each time.

Creating a first user avatar from denser statistical data without a reference model may include using systems described above. In the post processing modeling discussion, each system may rely on a pre-existing motion model used to help smooth out the new depth sensor data due to the noise inherent in positioning human skeletons in space using skeletal inference from depth sensor readings.

In an example, a new motion model may be generated. For example, a truncated version of concept 1 may be used. After the smoothing process is done for the statistically inferred line segments derived from the new depth sensor data alone, this is sent to the reconstruction step and this is the first reference model. With this in hand, and another set of new depth sensor data, the full process may be applied to determine a "first user avatar".

Alternatively, the process may be iterated one or several more times to ensure sufficient quality before releasing what a "first user avatar".

The process 300A includes an operation 312 to output the updated reference model.

FIG. 3B illustrates example smoothed line segments.

Operation 300B1 illustrates smoothing within individual trajectories. Within each trajectory, "sequential clusters" of four points may be operated on.

The process may operate on all possible sequential clusters (with adjustments for the beginning and end of the time series of the trajectories to address those points differently) so as to find new points each of which is a new point in between two previously existing points thus creating a more densely defined trajectory.

Operation 300B2 illustrates an extension of outer line segments. For example, this includes extending the outer line segments such that their outer-most endpoints remain in the same spot, they still pass through the points where their inner-most points were, but continue past that point a distance of half their original length.

Operation 300B3 illustrates generating a weighted average. The four points in the diagram represented with large circles have their positions averaged in order to generate the new point. This new point is the endpoint of two new line segments which replaces the central line segment in the sequential cluster. Operation 300B3 is used for finding the right weighting scheme for a weighted average of the four points. Examples of static weightings are described throughout the present disclosure, as well as a scheme for accurate dynamic weighting.

Operation 300B4 illustrates identifying and storing new line segments in the new trajectory. The single line segment at the center of the cluster has been replaced by the two line segments which each include the new point. In an example, the old line segment may still be used to perform smoothing in other sequential clusters in which it would be included, so it may be stored. The operation 300B4 may work through trajectories one sequential cluster at a time before working through other trajectories. When all trajectories have been processed, that is one iteration of smoothing.

FIG. 3C illustrates a flowchart showing a process 300C for smoothing trajectories. The process 300C includes an operation 320 to break motion data into body segment trajectories. The process 300C includes an operation 322 to break trajectories into sequential clusters, for example of 4 points each. The process 300C includes an operation 324 to find the extension points for each cluster. In an example, an extension point is halfway between a location generated by reflecting an endpoint of the cluster across its neighboring point toward a center line segment in the cluster and a location of that neighboring point itself.

The process 300C includes an operation 326 to use weighted average to define an extra point which is inserted into the trajectory after smoothing has operated on sequential clusters (e.g., all clusters). In an example, operation 326 outputs "bifurcation points" which are the new points that govern the two new line segments that may replace the old central line segment in the cluster. The process 300C includes an operation 328 to generate bifurcation points at the beginning and end of the trajectory (e.g., using a modified weighted average). The process 300C includes an operation 330 to apply weights. Operation 330 may be applied iteratively with operations 326 and 328. The process 300C includes an operation 332 to output a smoothed trajectory. The smoothed trajectory may include original points plus points in between the original points that preserve the implied curvature of the trajectory.

Figure 4A:
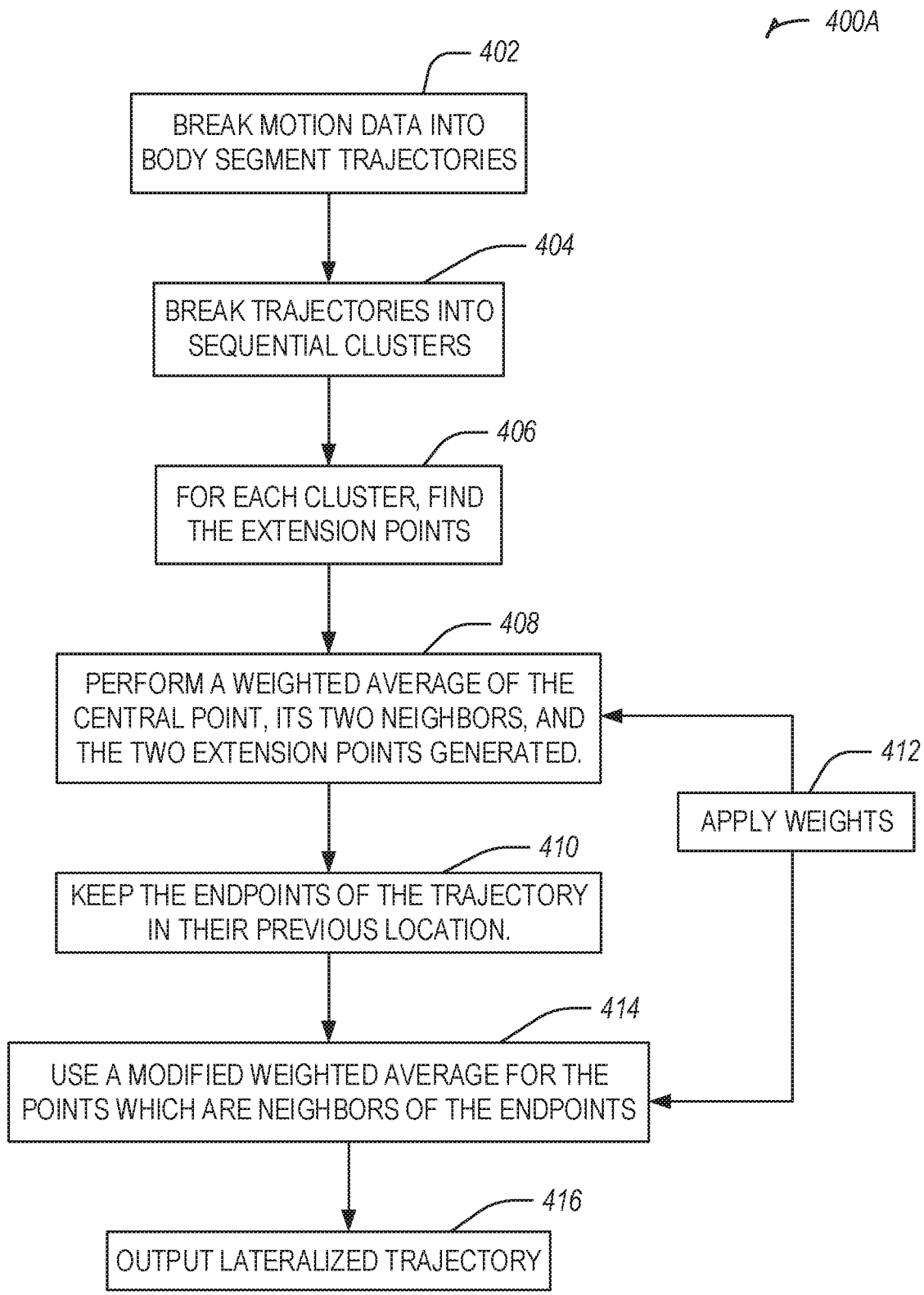
FIGS. 4A-4B illustrate a flowchart and a diagram showing noise reduction and lateralization processes in accordance with some examples.
Figure 4B:
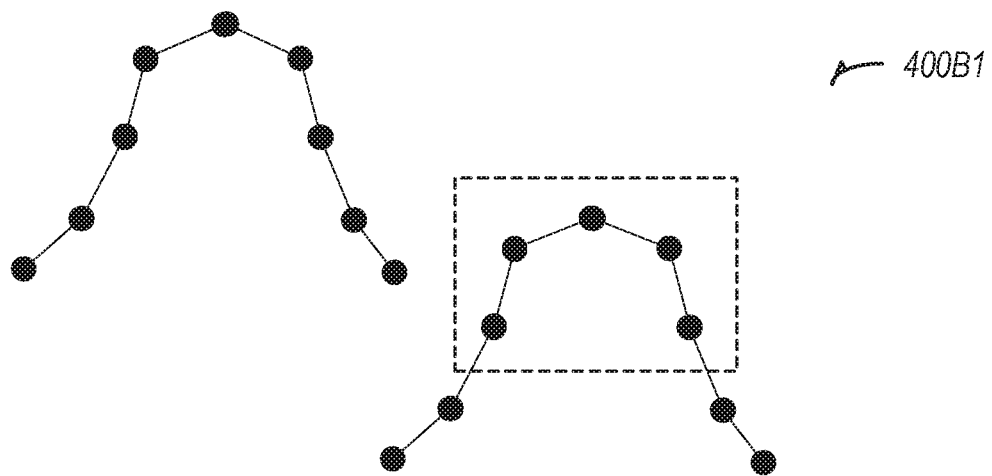
Figure 4B:
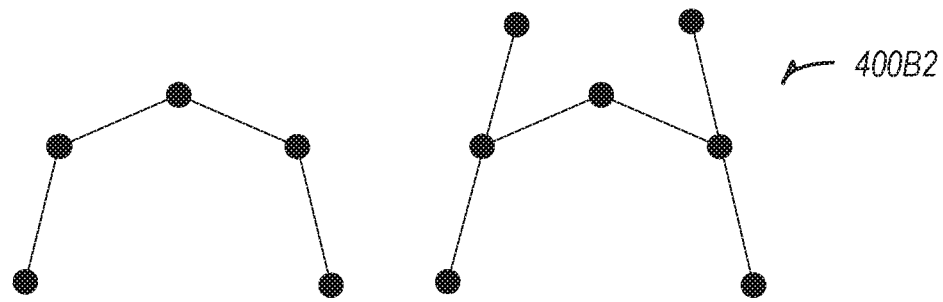
Figure 4B:
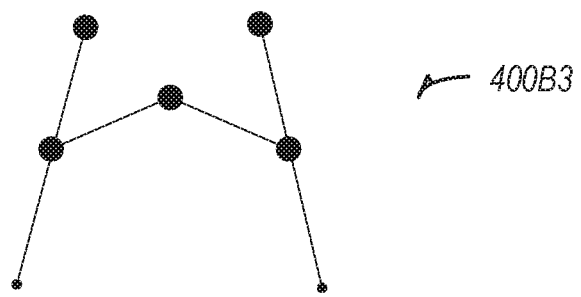
Figure 4B:
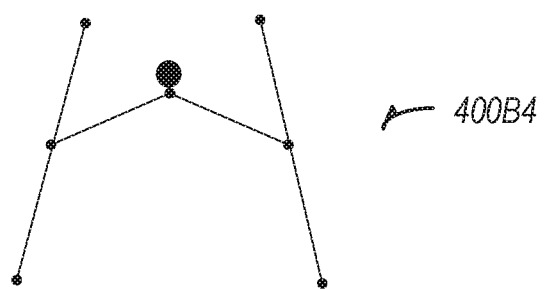

FIGS. 4A-4B illustrate a flowchart and a diagram showing noise reduction and lateralization processes (400A and 400B1-400B4) in accordance with some examples.

This optional routine reduces noise in the depth sensor data by creating interdependency within each trajectory so each point in a trajectory helps to constrain the rest.

This optional routine may be used to reduce volatility in "curvature". Curvature varies smoothly in most natural motion at human scale if that motion is measured or "sampled" at a high enough rate.

The process 400A is conceptually similar to "smoothing" but is executed with some key differences.

Instead of finding a central point in a cluster of 4, process 400A may be used to move the central point in a cluster of 5.

Instead of extending the exterior line segments in the cluster by half toward the middle, process 400A may be used to extend the exterior line segments by their full length toward the middle.

This gives 5 points from which to calculate a weighted average:
 The original central point
 The (2) neighbors of that point
 The two points found by extending the exterior line segments Weighting schemes can be tuned for purpose.

Process 400A may converge to the target over many iterations, so the original position of the central point may logically get the lion's share of the weight A dynamic weighting system that uses the ratio of the distance between the extension points to the distance between the neighbors offers better tuning. The function is complicated and is elaborated on in the "Advanced Smoothing and Lateralization section".

The process 400A includes an operation 402 to break motion data into body segment trajectories. The process 400A includes an operation 404 to break trajectories into sequential clusters, for example of 5 points each. The process 400A includes an operation 406 to for each cluster, find the extension points. In an example, an extension point is halfway between a location generated by reflecting an endpoint of the cluster across its neighboring point toward a center line segment in the cluster and a location of that neighboring point itself.

The process 400A includes an operation 408 to perform a weighted average of the central point, its two neighbors, and the two extension points generated. The process 400A includes an operation 410 to keep the endpoints of the trajectory in their previous location. The process 400A includes an operation 414 to use a modified weighted average for the points that are neighbors of the endpoints. The process 400A includes an operation 412 to apply weights. Operation 412 may be applied iteratively with operations 408 and 414. The process 400A includes an operation 416 to output a lateralized trajectory.

Here process 400A may be used to leverage the concept of smoothing which allowed new points in a trajectory to be generated in between the previously existing set of points where those new points roughly preserved the implicit curvature of the trajectory. The consideration of limiting computational complexity may impact the smoothing concept. Here the concept is applied in a way which leverages the interdependence of the points on a trajectory to bring outlying points back toward the implied trajectory.

This "lateralization" is an optional step which can be applied to the positions of the raw depth sensor data, the representative trajectory generated when statistical inferred line segments are connected, or even later in the process (such as after smoothing) to further produce smooth representation of motion.

For the present method process 400A may be used to employ sequential clusters that was used in fitting line segments to data as well as smoothing. When fitting line segments, sequential clusters of 3 points may be used. In smoothing, clusters of 4 points may be used. In process 400A, clusters of 5 points may be used.

Here the process moves the central point in the cluster of 5 points closer to where it may be expected to be based on the positions of the other 4 points in the cluster. This location expectation is further based on the implied curvature of the trajectory as defined by the 5 points assuming they are actually noisy data about an underlying trajectory that has less volatile curvature than a path actually through the 5 points may have.

To do this, process 400A may be used to extend the two exterior line segments in the cluster to two times their full magnitude with the extra length extending toward the central point.

Extend—$((V_b-V_a))+V_b=EV_{ba}$ and $((V_d-V_e))+V_d=EV_{dc}$ (in an example, this "EV" is calculated differently from the EV in "smoothing")

Where, $V_n$ is the vector representation of a point on the trajectory and $EV_{nm}$ is the vector representation of the "extension point" of a line segment between two points in the trajectory (here those points are generic "n" and "m" but above are specified as "a" and "b" as well as "d" and "e") where said extension point may become an input to a calculation that repositions the central point in the cluster. Here $V_b$ and $V_d$ are sequentially the second and fourth points in the cluster and $V_a$ and $V_e$ are the first and fifth points in the cluster.

IP (referenced below) is the new "iterated point" which is the new point this whole process is designed to find. In this conception, IP is closer to the implied trajectory that the set of points is clustered around. When this is done for all interior points in the trajectory the set of newly generated iterated points may become the new representation of the trajectory.

Weighted average—(8 $V_c$+$EV_{ba}$+$V_b$+$V_d$+$EV_{dc}$)/12=IP. In this example, IP is "iterated point" and may be the position that may replace the previous vc in the cluster once all iterated points for the trajectory as it exists prior this step are found. Alternatives to 8,1,1,1,1 (coefficients or "weights" in the weighted average) are easily applied and can affect both how quickly in a series of iterated applications of this method the system may converge and settle on a central trajectory. But ones that converge quicker are more vulnerable to edge cases which overshoot so a balance is preferred. To little recalcitrance of the central point also risks processing out the real characteristics of the implied trajectory in one iteration. Process 400A may generate, for example, 12,1,1,1,1 on the extreme end of low risk/slow converging and 2,1,1,1,1 on the extreme end of high risk/fast converging.

Process 400A may be used to account for the line segments on the ends of the series. In the above scheme, the point being adjusted was the central point in a cluster of 5 points. To be clear, to complete this analysis, this cluster moves along the trajectory as a "kernel" does in image processing (albeit as a one dimensional analog) so it takes all 5 point sequential cluster positions that are possible given the sequential set of points in the trajectory. It cannot take positions that put the two earliest or the two latest points in the in the trajectory in the center of a 5 point cluster. So a different scheme may be used for those cases. As noted above, this may not be a problem if trajectories re closed paths that had matching starting and end points, but, in general, trajectories are open paths that start in one spot and end in another.

Process 400A may leave the two points on the extreme ends of the trajectory in place.

Alternatively, the following method may be used. assume the point to be moved is labeled $V_c$ even if either of $V_a$ and $V_b$ or $V_d$ and $V_e$ do not exist. Then points that do exist that are chronologically prior to $V_c$ may be $V_a$ and $V_b$. Likewise, points that do exist that are chronologically after $V_c$ may be $V_d$ and $V_e$.

For the first point in time series, IP=($EV_{dc}$+$2^{n+1}$*$V_c$)/(1+$2^{n+1}$)—where n is the number of times the process has been iterated. The effect of this is to reduce the influence of the $EV_{dc}$ each iteration so as to keep the end point from migrating to the location of $V_d$ over a large number of iterations. Without this, the impact of $EV_{dc}$ may be diminished with this weighting scheme for each iteration.

For the last point in time series, IP=($EV_{ba}$+$2^{n+1}$*$V_c$)/(1+$2^{n+1}$)

If holding the endpoints in place is given even higher priority, the influence may be diminished even more using $3^{n+1}$, $2^{n+2}$, $c*2^{n+1}$ may be used (where c is some constant), or some other similar exponential concept.

For the second and penultimate points in the time series, process 400A may use a different scheme.

Assume the point to be moved is labeled $V_c$ even if either of $V_a$ or $V_e$ exist.

For the second point in time series, IP=(2$EV_d$e+$V_b$+$V_d$+8$V_c$)/(12)

For the penultimate point in time series, IP=(2$EV_{ba}$+$V_b$+$V_d$+8$V_c$)/(12)

This allows a balanced influence between the neighboring points and the extension point of the line segments generated by the two points on the end of the cluster closest to the interior of the time series of the trajectory such that curvature can be preserved without the diminishing influence scheme above (the scheme for the two exterior-most points).

Other weighting schemes that keep the qualities that these have may work as well. The key feature for the system for moving the points on the ends of the trajectory is the controlling mechanism for the influence of the EV such that these points don't move in line with or on top of their two nearest neighbors. Key features for the next inward points (the exterior-most interior points) include the double influence of the EV point generated from the extension of the interior most line segment in the cluster and the recalcitrance to movement of the central point created by giving it more weight than the other three points combined.

A shorthand for this process is "lateralization".

Advanced Smoothing and Lateralization

The concepts of lateralization and smoothing are both about allowing neighboring points influence in determining the position of a central point. In lateralization, the central point already exists, but is moved in the process. In smoothing, a new point is generated.

In the advanced versions of these, the relationship between the distance between the closest neighboring points to this central point and the distance between the extension points generated in both processes are used to define the weight that the extension points have relative to the neighboring points in smoothing and relative to the central point and neighboring points in lateralization.

This decoding involves finding the ratio of the magnitude of the delta between the neighboring points to the magnitude of the delta between the extension points. This ratio is applied to a function that then outputs the ratio of the neighboring points' weights to the extension points weights in the weighted average.

For lateralization

There are three types of points (2 extension points, 2 neighbor points, and 1 target point). Their weighting is as follows.

Extension points—1

Neighbor points—neighbor points weight=2+((neighbor distance/extension distance)−1)/(neighbor distance/extension distance)

Target point—sum of weight of extension points and neighbor points times a constant "c", for example, target point weight=c*2*(neighbor points weight+extension points weight)=c*2*(neighbor points weight+1)

In an example, "c" is tuned to foster the right rate amount of recalcitrance to movement for the target point. Moving too fast risks processing out the real characteristics of the implied trajectory in one iteration and risks overshooting the desired trajectory. Moving too slowly results in low productivity of the algorithm given the volume of computational input. The best value for c moves the point as much as possible without adding risk and may be tuned in software testing. In a reasonable example, c=2.

As is standard in a weighted average, the sum of all the weights is the divisor.

Special cases include (end points, 1st interior points, very low distance ratios).

End points—use a method as described above that does not involve dynamic weighting.

1st interior points—use a method as described above that does not involve dynamic weighting.

Or 1 st interior points—(neighbor points weight=2+((neighbor distance/extension distance)−1)/(neighbor distance/extension distance), extension point weight=2, target point=sum of other weights).

In an example, and specific to the equation immediately above, a different definition of the extension distance for the first interior points may be used due to the lack of the extra neighbor needed to generate an extension.

In this case, process 400A may be used to determine twice the distance from the interior extension point to the plane which bisects the endpoint and the second interior point. For example, the magnitude of the vector from the end point to the second interior point—(2*(cos(180 magnitude of the vector from the end point formed by the lines connecting the end point to the second interior point and second interior point to the third interior point)*the magnitude of the vector between the second interior point and the third interior point)).

The concepts of first interior point (exterior-most interior point) and second interior point (interior neighbor of the exterior-most interior point) may be symmetrical with respect to the two ends of the trajectory.

For smoothing, there may be two types of points involved in finding the new bifurcation point (2 extension points and 2 neighbor points). Their weighting is as follows:

Extension points—1

Neighbor points—neighbor points weight=3+((neighbor distance/extension distance)−(3/2))/(neighbor distance/extension distance)

In smoothing, the extension of the neighboring line segments is by half of the length of those line segments as opposed to by the full length of the line segments in lateralization.

As is standard in a weighted average, the sum of all the weights is the divisor.

Special cases (bifurcating the end line segment).

End line segments—(neighbor weights−1, extension weight−2*(3+((neighbor distance/extension distance)−(3/2))/(neighbor distance/extension distance))).

In an example, a different definition of the extension distance for the end line segments may be used due to the endpoint lacking the neighbor needed to generate an extension.

In this case, process 400A may be used to determine twice the distance from the interior extension point to the plane which bisects the endpoint and the first interior point. For example, the magnitude of the vector from the end point to the first interior point−(2*(cos(180−the angle at the first interior point formed by the lines connecting the end point to the first interior point and first interior point to the second interior point)*half the magnitude of the vector between the first interior point and the second interior point)).

The concepts of first interior point and second interior point may be symmetrical with respect to the two ends of the trajectory.

FIG. 4B illustrates a lateralization process for a trajectory. Operation 400B1 illustrates lateralization within an individual trajectories. Within each trajectory, "sequential clusters" of five points may be operated on. The process may operate on all possible sequential clusters (with adjustments for the beginning and end of the time series of the trajectories to address those points differently) so as to find a new set of points. In an example, when all of the points in this new set are found, a new, updated, trajectory is formed.

Operation 400B2 illustrates an extension of outer line segments. For example, the length of the outer line segments in the cluster may be doubled such that the center point of the new ones are located where their interior most point used to be (the endpoint they shared with their neighboring line segments).

Operation 400B3 illustrates generating a weighted average. The five points in operation 400B3 represented with large circles have their positions averaged in order to generate the new point. The new point may replace the central point in the sequential cluster (and closest to the central area of the five points being averaged). Operation 400B3 is used for finding the right weighting scheme for a weighted average of the five points. Examples of static weightings are described throughout the present disclosure, as well as a scheme for accurate dynamic weighting.

Operation 400B4 illustrates identifying and storing a new point in the new trajectory, for example, when the full process is completed. The operation 400B4 may proceed to the next sequential cluster for its processing until the trajectory is exhausted. When the trajectory is exhausted it operation 400B4 may include advancing to the next trajectory until they are all exhausted, at which point a completed iteration of lateralization is realized.

Tuned Lateralization and Densification of Reference Model Trajectories

Lateralization de-noises the trajectories in a motion model, or, if over-done, it also smoothes out characteristic features. Smoothing densifies reference model trajectories but locks in noise and other features. So the approach here is to lateralize just the right number of times before smoothing or interpolating. In an embodiment, iteration follows smoothing which follows lateralization.

Smoothing adds data points, by adding enough to cover all possible time targets that are be used during latency reduction or real-time interpolation. Some possible real-time interpolation time targets, based on hardware display frame rates, may not align well with ratios defined by powers of ½, such as input sampling at 30 hz and outputting frames at 90 fps giving a ⅓ ratio. In that case a weighted average of the values in the look up table, for example, for frames ¼ and ½ of the way between two input frames, is used to find the approximate values for the frame ⅓ of the way between those two input frames. Smoothing and interpolation may stop when all targeted times for predictions have all relevant 1-retrograde deltas and RM-RPA vectors filled in for the time targets that can be anticipated.

Lateralization may proceed through enough iterations to take noise out of each trajectory and then stop. Noise creates curvature volatility on the smallest scales. The system may measure this as the global representative change in local curvature (local delta delta delta). "Local" here refers to the computations being between neighboring line segments, not ones far away. This may be an average.

The system may also measure a global representative curvature for a trajectory (delta delta). This may be an average and may also be local, but may be better if calculated among more distant line segments.

Lateralization as described elsewhere in this detailed description may include bringing both the global representative change in local curvature and the global representative curvature down. However, the global curvature may change slower than global representative change in local curvature. It may change very minimally over the first, say, four iterations. The objective may include getting the global representative change in local curvature below a certain threshold, however, it may be damaging to get to that threshold if global curvature is dropping too much.

In an example, the system may continue iterating lateralization until the global representative change in local curvature drops below an aggressive threshold (low-valued threshold) or the global representative curvature drops below a certain threshold (where that threshold may be a certain percentage of its original value).

When the global representative curvature drops below its threshold, the system may check if global representative change in local curvature is below a conservative threshold (higher-valued threshold than the aggressive threshold), and if so, stop lateralization.

If not, the system may iterate until the global representative curvature divided by the global representative change in local curvature is above a certain threshold. This calculation and threshold may be designed to stop the process when a balance is achieved between reducing the noise measurement and keeping the overall curvature relatively high in cases where more idealized thresholds were unable to achieve the right amount of de-noising at very minimal damage to overall curvature.

When iteration of lateralization stops, the system may move on to densification (smoothing and interpolation).

Figure 5:
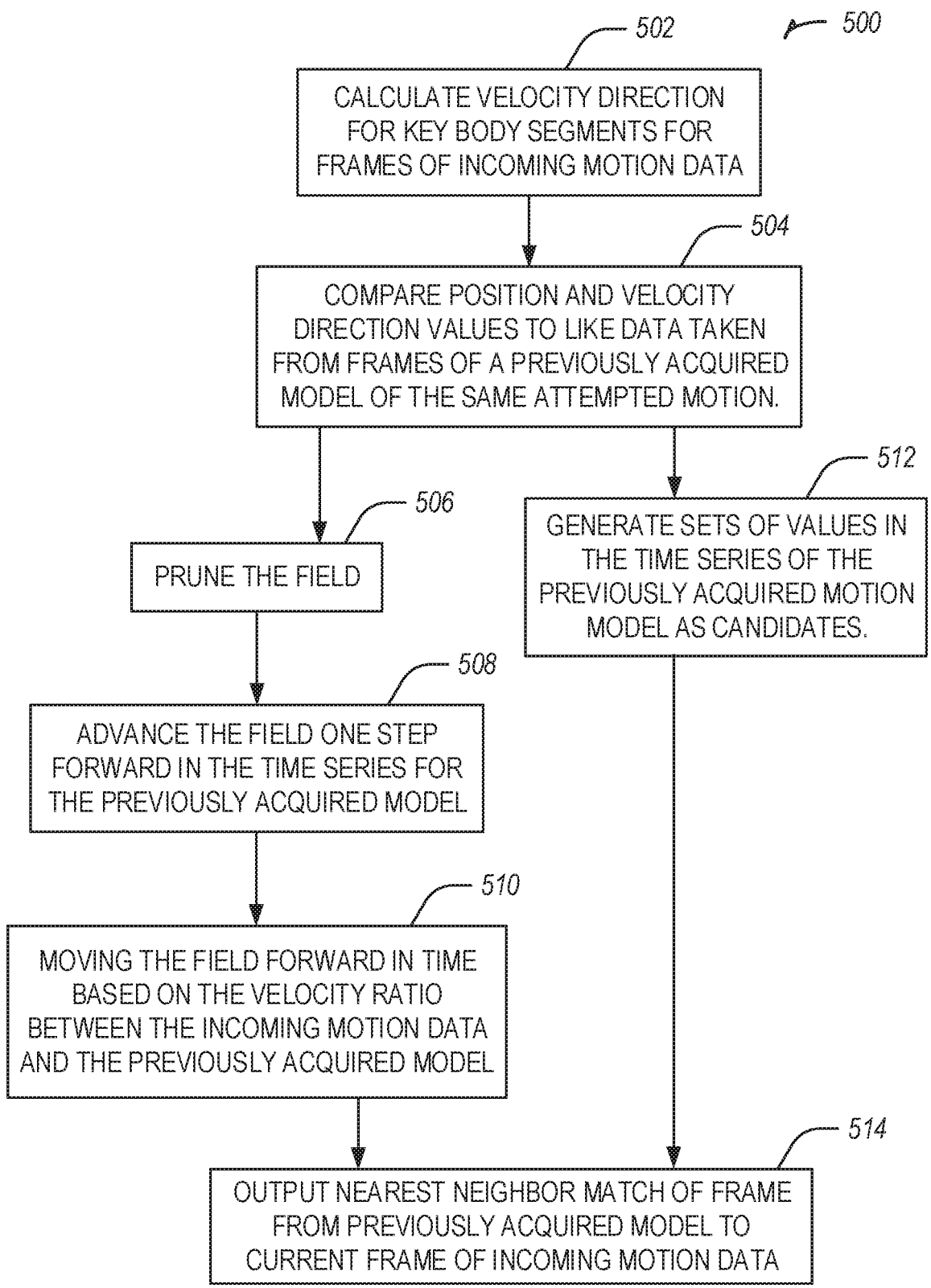
FIG. 5 illustrates a diagram illustrating an example pruned nearest neighbors process in accordance with some examples.

FIG. 5 illustrates a diagram illustrating an example pruned nearest neighbors process 500 in accordance with some examples.

The process 500 includes an operation 502 to calculate velocity direction for key body segments for frames of incoming motion data.

The process 500 includes an operation 504 to compare position and velocity direction values to like data taken from frames of a previously acquired model of the same attempted motion. The results of operation 504 may be output to operation 506 or 512 below.

The process 500 includes an operation 506 to prune the field.

The process 500 includes an operation 508 to advance the field one step forward in the time series for the previously acquired model.

The process 500 includes an operation 510 to moving the field forward in time based on the velocity ratio between the incoming motion data and the previously acquired model.

The process 500 includes an operation 512 to generate sets of values in the time series of the previously acquired motion model as candidates.

The process 500 includes an operation 514 to output Nearest Neighbor match of frame from previously acquired model to current frame of incoming motion data. Operation 514 may include using the output of operation 510 or 512.

General scheme for nearest neighbor and pruned nearest neighbor

Scale reference model to close match to the size of the user (using the reciprocal of the ratio of selected segment lengths between the reference model and the user avatar)

For each frame, move the core and two other selected points to pre-specified locations in the coordinate space for both the reference model and the new user data. The pre-specification involves setting the core segment at a rigidly pre-defined location and finding a next point which is in a pre-defined direction from that point, and a third point in a pre-specified plane with the other two and such that their distances from each other are the right scaled distance (based on scaling factor that adjusted the reference model to the user size).

The core point is translated to its pre-specified point first (for both the reference model and the user avatar) via a translation. All points in both models are moved with this translation to as to preserve the internal location relationships between all points in both models for each frame. Then the rotations that are applied to bring the other points to their specified locations are also applied so that the entire models are rotated, again in a way that preserves the internal location relationships between all points in both models for each frame.

Calculate total Euclidian Distance between the body segments in the user's body representation from depth sensors and all like body segments in the reference model body constructions in the field of reference model body positions that are under consideration (this "field" may be the full set of body positions in the time series or may be a pruned set based on routines defined below). Here "total" in "total Euclidian distance" implies summing each individual one. Alternatively, weights may be applied in order to prioritize certain body segments. If a small set of body segments do most of the work, some weights may be zero, thus effectively eliminating some segments from the calculation (and making the system more efficient).

Calculate total velocity direction differences as Euclidian Distances between magnitude renormalized vectors (a magnitude renormalized vector is the vector itself divided by its magnitude) from the user's motion for each body segment in the user's body representation from depth sensors and all the vectors for like body segments in the reference model body constructions in the field of reference model body positions that are under consideration (this "field" may be the full set of body positions in the time series or may be a pruned set based on routines defined below). Weights may be applied in order to prioritize certain body segments. If a small set of body segments do most of the work, some weights may be zero, thus effectively eliminating some segments from the calculation (and making the system more efficient). Calculate a final composite distance plus direction metric for the calculations for each pair of user body position and motion to within-field reference model body position and motion. This calculation may be a sum or a product of the body segment distances calc and the velocity directions calc and one or the other may be normalized by giving it a different weight from the other.

Choose the minimal final composite distance in the set of reference model positions under considerations as the "nearest neighbor" which can then be fed into processing and prediction of user position or another operation to generate display information for the user.

Pruning the Fields

Process 500 may apply a scheme that automatically reduces the scope of the possible reference model positions that are under consideration based on the logic of the "time series". Each body position removed from consideration saves all computation involved in calculating the various Euclidian distances between the reference models parts plus the velocities of its parts and like quantities in the new user data.

The pruned fields that the nearest neighbor calculations may operate on may be selected based on performing the operation on earlier candidates in both time-series and considering the most recent nearest neighbor that had been chosen in that way. Then process 500 system may advance forward in the time series one step for each model and search in that stepped forward field. Of course this leaves the question of where this may all start. It may start at the beginning of the time series for both models working forward one time step in each model from the matched positions in the times series that was found in that first search. A trigger field (explained below) may modify this by giving a different basis for the first match, however subsequent matches may proceed as described here in that case.

In an example, if frame "i" in the user data was matched to frame "j" in the reference model, then the match may exist for frame i+1 to be j+1. However, due to velocity differences, which may be present, it may be the case that j itself, j+1, or j+2 may be the actual match. In an example, j−1, j, j+1, j+2, and j+3 may be considered. This is a range of 2 frames around the expected match j+1.

In an example, when searching for the match for i+1 based on a previous match of i to j, process 500 may search a range of n frames around j+1 where n may be bigger if velocity differences are more volatile in the human movement technique in question.

The description of the operation of the Nearest Neighbor algorithm above may be independent of this pruning. It can calculate a position and/or velocity direction match between new user data and a reference model with whichever type of field it is presented. Once this is calculated, the minimal value can be selected and the associated pairing of reference model frame to new user data frame may be defined as the match.

Velocity projected pruning may include pruning of the field of candidates for a nearest neighbor identification algorithm, in its basic form, assuming roughly one-to-one alignment and scaling of velocity vectors. In an example, the system can be made more general.

Process 500 may maintain the same field size, say of 5 frames. The way to think of this is that there is a central candidate that is the most likely nearest neighbor and then two before and two after that one that are less likely, but very possible. This field size can be larger, may be asymmetric (most likely one not being in the center), or may even scale dynamically such that a larger field is used when there is larger user velocity. Those options are not described in detail here, but enabling those adjustments are uncomplicated steps beyond this discussion.

In order to project this field based on the currently identified nearest neighbor, the center of the field may be moved forward in the time series based on the component of the user's velocity in the direction of reference model's velocity. The magnitude of this component may be divided by the magnitude of the reference model's velocity.

This involves calculating the Euclidian length of each vector, calculating the cosine of the angle between them (cosine can be found by calculating the dot product of the two vectors and then dividing the result by the product of the magnitudes of the two vectors). Then process 500 may multiply the result of the cosine with the magnitude of user velocity and divide by the magnitude of the reference model velocity. This may be simplified algebraically simply dividing the dot product by the square of the reference model velocity. If it is expected that these two vectors may be well aligned, then the step of calculating the cosine is not needed and process 500 may instead simply work with the ratio of user velocity to reference model velocity.

This may be done for either of all of each model's measured body segments or a representative set of them.

Then, process 500 may be used to multiply the result of the calculation by 1 frame (or one time step in the reference model's time series) and rounding to the nearest whole number to determine how many frames in advance to center the field of candidates for the nearest neighbor determination.

Pruned nearest neighbor enabled user-to-expert analogous position visualization may include the following.

Once process 500 has matched user position to reference model position, process 500 may be used to can instruct the system to display that position of the reference model.

This creates real-time display of the "correct" position of the technique for that particular time in the technique process.

Real-time simultaneous display of an expert model as a qualitative target for a technique for the user to mimic as well as the user's instantaneous position as they attempt a technique is not commonly used because it is difficult to align the timing of the two motions. Conceptually, the expert model is analogous to a reference model in that it is a pre-captured and stored motion model. In the case of an expert model, it may preferentially be taken from world class experts at the technique in question.

This can be solved in a slow motion condition by asking the user to match the timing of the expert model motion. They may struggle to match timing accurately until they have practiced specifically that. Even then, the match may be less than ideal.

An alternative way to make this work is to manipulate the reference model display so that the reference model matches the user's timing.

Determining where the user is within the action may be determined using a nearest neighbor algorithm. The nearest neighbor algorithm may use a modified field specifically stored for making this determination which may be called a "trigger field". Trigger fields are described below.

Once the closest position within the time-series of positions in the reference model (nearest neighbor) is identified, the system may be directed to display that "frame" of the reference model time series.

In order to smooth this expert model sequence and to generalize smooth display to a broader class of exercises, the pruning system may be modified such that the field of nearest neighbor candidates for the next user position may be centered based on the ratio of user velocity to reference model velocity (velocity projected pruning).

This may apply even for reverse direction velocities executed by the user (which represent reverse direction technique execution or "backing up").

There may be value in synching the expert model's position to the user avatar's position as described here, but there is also value in showing only the expert model. In this case the expert model is still synchronized with the user's actual physical body position.

Pruned nearest neighbor enabled user-to-expert time-advanced position visualization Alternatively, after matching, process 500 may instruct the system to display a slightly time-advanced position of the reference model.

Time advancement can be set to be a specific number of frames forward.

Or it may vary based on the ratio of user velocity to reference model velocity thus creating a stable amount of time forward.

The optimal amount of time forward to display is a perceptual question that may be resolved through user testing. It may be individual, exercise, or even state-of-mind dependent.

A system which can show the time-aligned positions of a representation of a user and a pre-captured expert motion model can be adjusted to present a time-advanced position for the expert motion model thus displaying to the user the ideal position they may be moving toward.

In general, this can be done with the time-aligned or time-advanced motion model displayed. The representation of the user's motion is an optional addition.

The nearest neighbor matching algorithm ("pruned nearest neighbor") may be used to find matching-body-position frames between the user's measured body position and the positions in the time series of the expert model.

With this matching, process 500 may then leverage pre-calculated velocity calculations from the expert model time series and run-time velocity calculations (delta vectors from one instant in the time series to the next for like body segments) to generate a future-projected position for the expert model.

Process 500 may be used to set up a "time projection factor" which is a time-difference into the future of the time-series of the movement that the system may use to select a frame from the expert model time series to display. This time projection factor is part of the user experience and its precise tuning may dictate its effectiveness as a training aid, so picking the perfect time projection factor may be a matter of testing. For this example, it may be equal 100 ms.

Within the expert model system, the frame that is 100 ms into the future (likely there may be one at that moment as most computerized capture systems operate at a multiple of 30 hz which does have frames that differ by 100 ms) is a position that the expert's body found itself in 100 ms after the one that the nearest neighbor system identified as the most similar to the user's current position. In an example, the expert had a certain velocity which the user may not be matching.

So the present process 500 may multiply that 100 ms by the ratio of user velocity to the expert model velocity. To do this, a representative global average velocity may be used.

A global average velocity may be an average velocity of all body segments.

This is likely overkill so instead it may just use a representative sample of body segments.

These velocities are pre-calculated in the expert model, so calculation of a representative global average may rely on finding the values in an effective look-up table and calculating the average.

For the user's body position, velocities from the analogous subset of body segments may to be calculated on the fly before averaging. Once the averages are calculated, their absolute values can be taken to then create the ratio defined as the magnitude of the representative global average velocity of the user divided by the same for the expert model.

Then, the output number of milliseconds can be divided by the number of milliseconds per frame (and rounded to the nearest whole number) to give the number of frames forward (relative to the output from the pruned nearest neighbor result) in the expert model to display.

User-to-expert analogous position display in 2D video, and the same display processes may be done with video.

In an example, matching up user body positions to reference model's positions may be done at a skeletal level. Neither depth sensors nor video measures skeletal position directly. In an example, some system may be in place to infer skeletal positions based on video imagery in the user video feed.

This same system may, via its inference process, tag each frame of the expert model or reference model video with the skeletal position data. In principal, this may be done at runtime, but it may be most efficient to do this in advance and tag each frame of the expert model video with skeletal position information as meta-data.

Extra care may be used to create similar camera angles in the two videos.

This skeletal position information may constitute the field of options for the nearest neighbor algorithm (or pruned nearest neighbor) to computationally compare (via Euclidian-distance-based calculations) user body positions against.

Alternatively, the reference model may not be a prefabricated video and instead the video may be generated at runtime via animation of an avatar using the time-series of expert model position data where the skeletal position of the expert model displayed is the one selected by the nearest neighbor algorithm.

This relies on very similar camera angles so that analogous depth information is lost in the tagged reference model video frames and skeletal positions as well as the live user video frames. Alternatively, if the reference model is stored in 3D, a "2D shadow" of that model can be calculated at runtime or immediately before user video is captured in a preparatory step which is a projection of skeletal positions into 2D by losing depth information along the axis of the camera angle. The system may be calibrated so it may "know" the angle that the camera is taking relative to the user and so it may apply the same angle in the calculations of the 2D shadow.

General scheme for trigger fields for initiating and concluding "within technique tracking mode".

Purpose of trigger fields: trigger fields enable the present system to leverage a nearest neighbor calculation as a way to automatically determine when a user has started executing a technique and to determine the point where the user has finished the technique. This is useful for trimming during post processing and during computation-mode-determination in real-time data representation mode. The modes that are switched between may include:

Raw ds mode—display data directly from raw depth sensor skeletal inferences.

Predictive modeling mode—display of data from predictive system.

The following outlines the general concept.

When the user is in the sensor field and about ready to have their motion tracked and represented to them during execution of a technique, an indication of tracking may be displayed and this may be in the form of showing them their latent body positions representations coming in from depth sensors. This may give the user confidence in the system in so far as it shows that it is tracking and is ready to go even if latency reduction measures are not yet in play.

Predictive modeling during this pre-technique phase may be unattainable because there may not be a precise motion model for it and thus, a reduced basis for predicting future body positions.

Process 500 may be used to automatically switch between a standard track-and-display using depth sensor skeletal inferences mode and a predict-to-track-and-display mode for technique execution, using forward modeling. A threshold-controlled pruned nearest neighbor may be used to switch between these modes.

For example, a "trigger field" may be set up, which is a set of the reference model's time-series constructions to be matched to user body positions and kinematics using, for example, the same nearest neighbor Euclidian distance scheme discussed above.

When the match is good enough based on the distance calculation from the nearest neighbor calculation being below a threshold for one of the frames in the reference model's trigger field, the system identifies that the user has begun the technique and begins predictive tracking. This trigger field may consist of reference model frames from the beginning of the time series of the reference model process.

Finishing predictive tracking (switching back to normal depth sensor reading tracking mode) can be done either by an input from the instructor or user (screen, voice, gesture, or other) in the case of a cyclical skill (which may not have a natural finishing point) or by institution of a second trigger field which consists of final reference model frames located at the end of the reference model's time series. In an example, for a discrete (not cyclical) skill, predictive tracking mode may be "on" when the conditions have been met to trip the beginning trigger field, but the conditions have not yet been met to trip the final trigger field.

If the user never gets within threshold for the final trigger field, there may be a failsafe of a maximum time for the technique being attempted that is, in an embodiment, 25% longer than the reference model.

In an example where there is no reference model, forward modeling based on kinematics alone may constrain depth sensor inferences for more accurate tracking and even to achieve some prediction accuracy, but accuracy may be limited without a reference model to constrain the future curvature of trajectories.

In an example, trimming of pre and post technique phases of recording during post processing modes may also benefit from trigger field type processing so as to automate the part of the analysis which determines what portion of the recording reflects the technique itself and which portions reflect preparation and "off-ramping".

Figure 6:
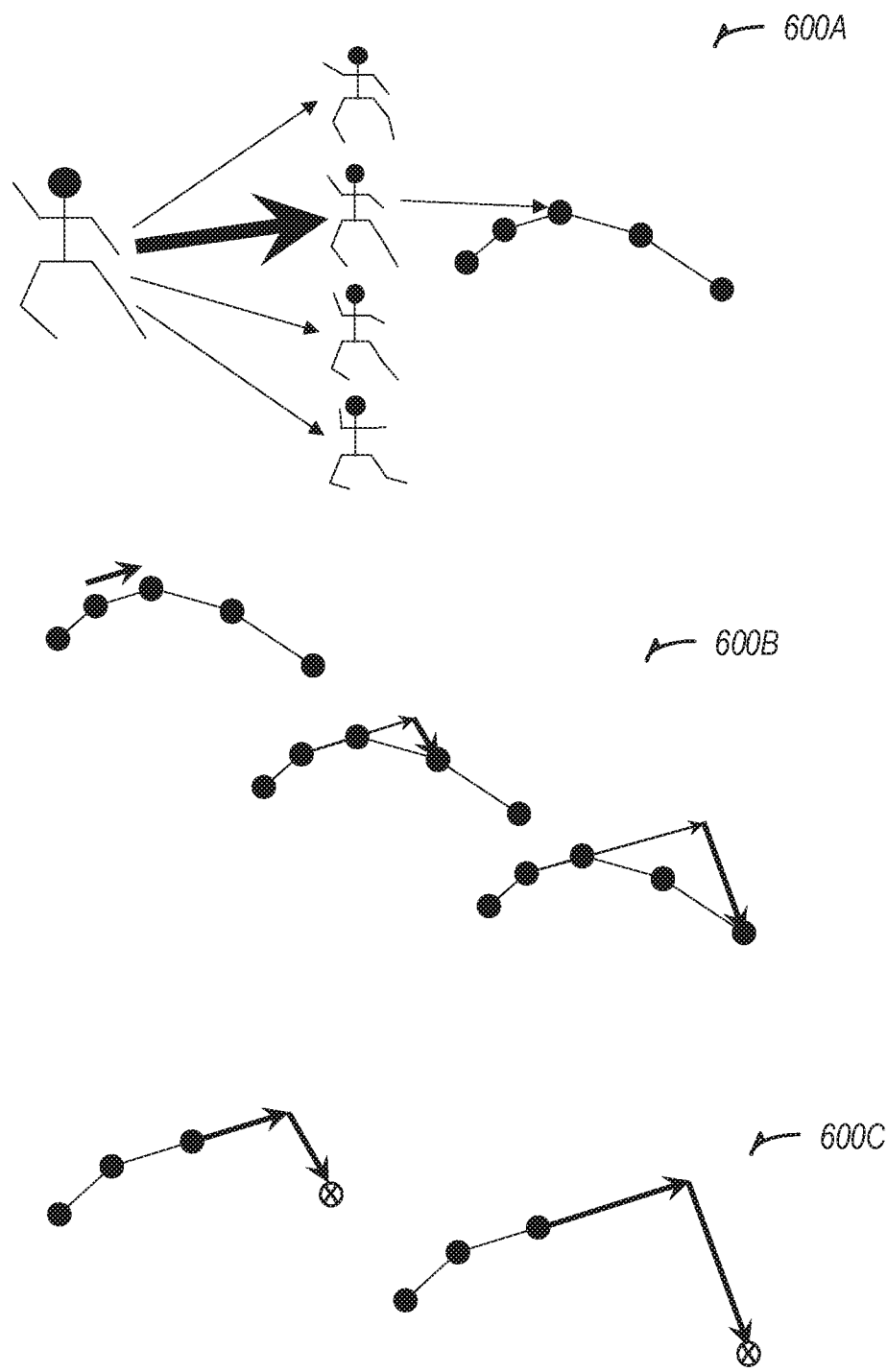
FIG. 6 illustrates a diagram illustrating a latency reducing predictive modeling process in accordance with some examples.

FIG. 6 illustrates a diagram illustrating a latency reducing predictive modeling process in accordance with some examples. Operation 600A illustrates context matching. For example, a Pruned Nearest Neighbor process matches user position to a certain position in the time series of a reference model. This matching identifies the time value within the time series that are used. This time value points to specific points within each of the trajectories of the reference model that localize the 1-retrograde delta and RM-RPA are used to make predictions.

Operation 600B illustrates calculating vectors. 1-retrograde deltas and RM-RPA's are calculated. The thick arrow in the upper left diagram is the 1-retrograde delta. In the middle diagram, the 1-retrograde delta is scaled one frame forward (it is the thin arrow here). The difference between its new endpoint and the actual body segment position point one frame forward is the RM-RPA for predicting one frame forward. In this diagram the RM-RPA is the thick arrow. In the bottom right diagram, the 1-retrograde delta is scaled two frames forward and the RM-RPA is the difference between the scaled 1-retrograde delta's endpoint and the body segment's position two frames forward. Again the thin arrow is the scaled 1-retrograde delta and the RM-RPA is the thick arrow.

Operation 600C illustrates generating predictions. Velocity scaling is used to modify the 1-retrograde delta and RM-RPA for a given future frame's target time. This may be in addition to scaling for number of frames forward. 1-retrograde deltas scale by the number of frames forward all times the ratio of user velocity to reference model velocity. Their tail is then positioned at the current depth sensor measured position of the body segment. RM-RPAs scale based on the ratio of user velocity to reference model velocity. The diagram on the left is predicting one frame forward and user velocity is modeled as being higher than reference model velocity at this portion of the technique. On the right, the projection is two frames forward.

General Scheme for Runtime Predicting

In an example, the term "frame" may include a slice of a full time series of body positions where all data points in said slice have the same time-parameter in the time series. This analogizes to the use of "frame" in video where all of the pixel values in any "frame" have the same time-parameter. In an example, a concept of a "delta" or "delta vector" may be used herein. A delta generally refers to a difference between two objects. A difference implies subtraction. For this document, unless otherwise specified, a "delta" or "delta vector" may be generated by standard vector subtraction. In an example, this is done with a vector from earlier in the time series subtracted from a later one. In this conception, standard Cartesian coordinate positions specifications are viewed as vectors.

Match user position to reference model position using pruned nearest neighbor (consider both position and velocity).

Determine when user starts and finishes technique by setting aside certain time-series portions of the reference model as "trigger fields". When the user matches a position in the start trigger field, predictive mode can begin. When they subsequently match a position in the end trigger field, predictive mode ends.

Calculus-type modules.

Velocity projection—scales with ratio of user to reference model velocity.

Curvature projection—scales with the ratio of user to reference model velocity squared.

Between the two, a predicted point is found which is where the system expects the user's body part to move to in the target amount of time forward.

Reassembly: found points are then combined into a full body construction (may move some points around in a sensible way to preserve anthropometric model).

Body construction is delivered to animation or other interface representation pipeline.

In an example, if the animation pipeline can start producing imagery that is associated with where the user is about to be before the user gets there, that imagery can be delivered nearly simultaneous with the user's arrival.

Do this by predictive modeling. The prediction is based on:

The position of the user at previous time steps;

The discrete analogs of velocity and acceleration vectors associated with those previous time steps; and The positions, velocities, and accelerations associated with like time steps in a previously captured (and approved) version of the technique.

Make position predictions 1, 2, 3, or possibly even more frames in advance (data may be coming in at 30 hz. Process 600 may output visuals at a particular frame rate, such as 30 fps. In an example, a form of extrapolation to output at a higher rate [normally termed "interpolation"] may be used. This is executable by a scaled version of the 1, 2, or 3 frame predictive calculations.

Reference models may have pre-existing data for frames within their time series that are analogous to the frames coming from depth sensor skeletal tracking. These best-matches between reference model frames and depth sensor frames are calculated via positional comparisons seeking minimization of a pre-defined distance calculation between the two (the pruned nearest neighbor described above). As such, deltas between the reference models' positions in currently matched frames and their frames 1, 2, 3, or even more into the expected time-series-future may be available to us. These deltas may be called "predicting deltas".

Process 600 may scale these predicting deltas based on the ratio of the magnitude of user velocity to reference model velocity for a given body segment in the current frame of the user and the analogous frame of the reference model. This ratio is the "scaling factor".

Define a "1-retrograde delta" as the direction of the user's trajectory from the previous time step to the current represented by a vector calculated as the vector representing the current position minus the vector representing the previous time-steps position for the body segment in question.

This may be applied as an extension of the current position in a scaled fashion. It may be scaled by the predicted number of frames in advance and by the scaling factor already defined. This gives a first approximation of the 1, 2, or more frames in advance position prediction for the body segment in question.

In an example, this approximation prediction is generated not only by scaling the 1-retrograde delta, but also by repositioning it compared to the time position it had when it was calculated from the reference model. For example, when the 1-retrograde delta specific to the user's current motion is found in the reference model, this is done using the pruned-nearest-neighbor-matched position as the point which defines its tip of the 1-retrograde delta and the position in the reference model one time step prior as its tail. When transferred to the user data, it has its tail attached to the user's current position and then scaled by how many frames forward to project as well as the velocity ratio between the user and the analogous position in the reference model.

This first approximation may be modified by a formula which accounts for the expected acceleration associated with the technique for this body segment at this moment in the technique. The acceleration is represented as the difference from what the reference model's scaled 1-retrograde delta for the appropriate number of frames ahead to the actual position of that body segment in the time series of the reference model that same number of frames ahead. This difference may be defined as the "RM-RPA delta" (RM-RPA="reference model retrograde predicted to actual").

To get the second approximation (and final for this method) this RM-RPA delta may be calculated from the analogous moment in the reference model time series and then scaled based on a modified version of the scaling factor where the square of the scaling factor is used.

This RM-RPA delta is calculated as the difference from the position of the appropriate 1-retrograde delta prediction to the actual position of the body segment at the number of frames forward in the time series that the prediction applies to. It calculates precisely how much and in what direction the first approximation prediction may have had to be moved to have been accurate for the reference model's time-series of actual positions.

The RM-RPA scaling is again based on a ratio of user to reference model velocity magnitude (the scaling factor), but where the ratio is squared to ensure that variation of the ratio makes the prediction vary along a curved trajectory with minimal acceleration correction if the user's velocity is slow relative to the reference model's velocity and large acceleration correction if the user's velocity is high relative to the reference model's velocity. In an example, these segments may be largely traveling along curved arcs and higher velocities may lead to greater distances traveled along the curves and thus more deflection from linear motion.

In an example, as a measure to improve accuracy, the system may use the two instants in the reference model that are closest to the user position weighted by how much closer the body segment being projected was to the position in the closest reference model frame as compared to that next closest one as the basis for projecting the future user position. Then, their predictions may be averaged using the weighting described above to get the predicted location for the user at the targeted time. This allows better approximation for in-between positions of said body segment. This assumes the two nearest-neighbor-selected frames in the reference model are neighbors in the reference model time series. If this is true and since they are closest two resulting nearest neighbor choices, the user position may be approximately in between them. If the two are not neighbors, then this may revert to using only the basic single-nearest-neighbor projection method.

In an example, to scale for predictions further in advance, the time parameter may be scaled. This can be done by multiplying the 1-retrograde delta by the number of frames in advance for prediction. Then the above calculations may be applied in a normal fashion, except the RM-RPA delta is now the difference between the position resultant from the scaled 1-retroactive delta to the actual position the scaled number of frames in advance. Interpolation may be used for this calculation if the projection is to a fractional number of frames in advance. But even with a fractional number of frames applied for the prediction calculations, the calculations may be applied in the way described above.

Further, these predictions may be made for several time steps into the future simultaneously (1, 2, 3, etc. frame cycles or interpolation frames in between those, such as 1.5 or 2.333 frames into the future as described in the "predictive interpolation" description below) to ensure multiple predictions are delivered to the system (ones from 1, 2, 3, etc. frames cycles in the past) when the time comes to construct a final location.

Depending on the expected speed of the technique, the prediction used may come from a different number of frame steps in the past. Faster execution may benefit from use of predictions from further in the past to eliminate perception of positional latency.

Description of the reconstruction of the skeleton from calculated body segment positions that are of the same time parameter Following processing of within-trajectory data so as to improve accuracy or reduce latency, the system may need to reconstruct body segment positions specified by these trajectories into full body constructions. This is true for either of real-time or delayed processing conditions.

Reconstruction of within-frame full body positions: once future predicted positions are generated for all of the body segments for a given time instant, full body positions may be reconstructed from those segment positions following rules of "lateral modeling" which is to say the body fits together. This amounts to a combination of an anthropometric model to define expected distances between joints cross checked against expected angle ranges for multi-body-segment constructions. Further, application of confidence intervals ensures that body segments which feature more certainty in their positional accuracy may get to serve as anchor points that won't be allowed to move as far as lower confidence segments. To make things fit together, ones with lower confidence may be tweaked more.

In field of motion capture animation, motion of body segments that are consistently positioned in space based on the dimensions of an actor may be applied to a visualization model used to create the animated imagery which may have different effective dimensions. In an example, making body segment position data which doesn't yet respect the animation model's dimensional constraints without losing the character of the motion implied by that original body segment position data may use motion capture animation processes. This type of reconstruction routine may be applied to processes described herein.

Developing confidence intervals to constrain body reconstruction toward accurate positioning.

If the motion capture animation processes that are used for reconstruction as described above rely on confidence intervals to mediate compromises in body segment position when making them fit to the dimensions of an anthropometric model, confidence intervals on the positioning of different body segments may be derived as follows.

For within each forward model and for each body segment, an Instantaneous-2 Confidence Interval may be posited. This may be the depth sensor Confidence Interval (Instantaneous-1 Confidence Interval) divided by the sum of m times the magnitude of the reference model's velocity delta and n times the magnitude of the reference model's acceleration delta-delta ("n" is intended to be greater than "m" both are intended to increase high velocity's and high acceleration's influence in producing confidence-interval reducing effects). In an example, any or all of these confidence intervals may be normalized by dividing all of a given type by the relevant maximum value of that type (across confidence intervals for body segments within an instant, across confidence intervals for all instants for a single body segment, or across all confidence intervals in the time series, but typically within depth sensor, instantaneous-1, instantaneous-2, or higher order versions such as the composite confidence interval below). However, where confidence intervals are included in weighted averages prior normalizing of them is redundant because the weighted average operation always includes a normalizing denominator.

A composite confidence interval is calculated as the sum of the instantaneous-2 confidence intervals from the forward model(s) that apply to the current instant (thus, are derived from previous instants). If multiple forward models apply, it may be the composite confidence intervals that may be used in generating the final construction of the positions of all body segments for a given instant.

In an example, these composite confidence intervals may still be further modified by weightings such as those described in the series of approximations approach to reconstructing a body based on predicted positions of body segments.

The plan for allowing users to execute techniques during real-time data representation (most pertinently, real-time visual, or real-time audio or "sonification of movement") using predictive modeling to minimize latency may be as follows.

Slow speed technique may be used at first and during slow speed technique, the prediction algorithm may be implemented one frame in advance. At slower speeds, users may be more consistent thus giving a good match to the reference model on which the predictions are based.

Medium speed technique can be implemented during runtime predicting for real-time data representation as users get more consistent. During medium speed technique, the prediction algorithm may be implemented two frames in advance. At medium speeds, users with sufficient practice can be consistent enough to give a good match to the reference model on which the predictions are based.

High speed technique can be implemented during runtime predicting for real-time data representation as users get very consistent. During high speed technique, the prediction algorithm may be implemented three frames in advance. At high speeds, users have to be well practiced to be consistent enough to give a good match to the reference model on which the predictions are based. This match is extra important since the prediction is generated so far in advance.

Projecting three frames forward is a less accurate way to construct the body position at that future point compared with two frames forward, one frame forward, or using raw depth sensor readings from the actual instant to be represented. In an example, lack of accuracy is more tolerated when users are executing techniques at high speed for two reasons.

First, users lack time for perception as much more happens in the visual field (pertaining to the visual representation of their technique) in a short time, so details are not perceived as well.

Second, users may place more attention on the act of producing and controlling the movement at high speed, so there is little left for perception of feedback.

As a result, projecting multiple frames in advance becomes a high-upside, low-downside option for high speed technique. It allows delivery of low latency visual representation of body position and is accurate enough to avoid user discomfort with any differences between their body position and the represented body position largely due to the user's state of mind during execution of high speed technique.

In an example, in lock-step with the progression toward high speed execution is a progression of user avatars to be used as reference models for runtime predicting at those higher speeds.

Calculation of Velocity Deltas and Time-indexed Curvature Corrections. In an example, "Velocity deltas" refers to 1-retrograde deltas. In an example, "Curvature Corrections" refers to RM-RPA vectors. These may be calculated in the way described in the latency reduction and real-time interpolation sections of this detailed description.

An example modification may include calculating them using the original sampled frame rate timing as opposed to the denser data created via smoothing. They may be calculated using all available trajectory points, but, in this case, they are not be calculated using the nearest neighbors which are closer together than the sensor sample frame rate due to densification processes, but instead other points spaced one full input-frame-time distance (from the sensor sample rate) away.

For example, when smoothing is done twice, there are three position points for each body segment's trajectory that have been inserted in between the original position points in the trajectory. This modification calculates 1-retrograde deltas using position points that skip over three position points thus preserving the original sample timing from the sensors in these calculations.

This timing used in the reference model may also be the expected sample timing from sensors during real-time predicting because the same system is being used in both cases.

The following discussion may include a look-up table approach to latency reduction and real-time interpolation.

In an extension of many of the components described herein, described here is an approach that brings smoothing, lateralization, and interpolation together to crystallize informationally-dense reference models into low-cost-to-access look-up tables. The result is enhancement of the speed and computational efficiency of generating predictions during latency reduction routines.

It is possible to broaden the concept of the reference model in such a way as to execute in advance, much of the originally runtime computation needed to generate predictions. In an example, these computations are stored in a lookup table. In this conception, the reference model may be rebuilt for animation or stored in two separate forms. One of these two different forms may be the look-up table for run time prediction and the other would be the animation model for visual display.

The look-up table may contain calculated vectors which are indexed by a few parameters. The parameters serve to specify the location of the needed information and may be generated by the pruned nearest neighbor matching algorithm and mode specifications around how far ahead in time the system may be generating predictions. Mode specifications may be determined by how fast the user is attempting their technique or whether or not predictions from multiple past frames are converging to generate a composite prediction in the given embodiment.

Look-up tables give computational results with fewer computer operation steps at runtime compared to executing complex computations at runtime. Reduction of computational overhead affords a later start time in generating predictions which may help with accuracy.

In an example, the look-up table may include pre-fabricated values for time targets across a range of possible output framerates.

Achieving this may include using smoothing and proximity weighted interpolations. Smoothing is described elsewhere in this detailed description, and proximity weighted interpolations is described here in more detail. Their purpose, in this case, is to generate points whose time-position relative to the two closest time-values in the series is not is not a sum of some powers of ½ frames (based on input frame time) away from those neighbors. Any times that are a sum of some powers of ½ frames from its nearest neighbors are eventually generated given enough smoothing iterations. All other points are not accessible via smoothing.

In those cases, proximity weighted interpolation may be used to generate points between the points that exist after a specified number of smoothing iterations. This may be done such that those points are at times that output framerates can be anticipated to target (given near-future display hardware specifications) and where those points are generated via an average of the two existing points with the closest time parameter to the target and weighted by how close in time each of these existing points is to the target point.

These look-up tables may also be lateralized before the generation of all of the extra interior points that smoothing and or interpolation would generate, for example using a balanced lateralization process. This may be used to balance how much they are executed. They may be iterated just enough to diminish the impact of noise, but not enough to ruin the inherent shape of the trajectory.

The result of all of this is dynamic, fast, and robust predicting.

Storage and Indexing of Calculated Values into a Look-up Table (indexing involves both time and body segment values). The look-up table conception of the reference model still encompasses a time series of body positions in 3D space generated in the way described above, but now many features may have been added.

Smoothing may have added body positions in between the original body positions. Each body position in the time series may have pre-calculated vectors associated to it. Each piece of data associated to each body position may be indexed by the body segment it is specific to, the time that body position is seen in the time series, and the targeted time for the prediction it enables if applicable (this is only applicable to RM-RPAs).

Figure 7:
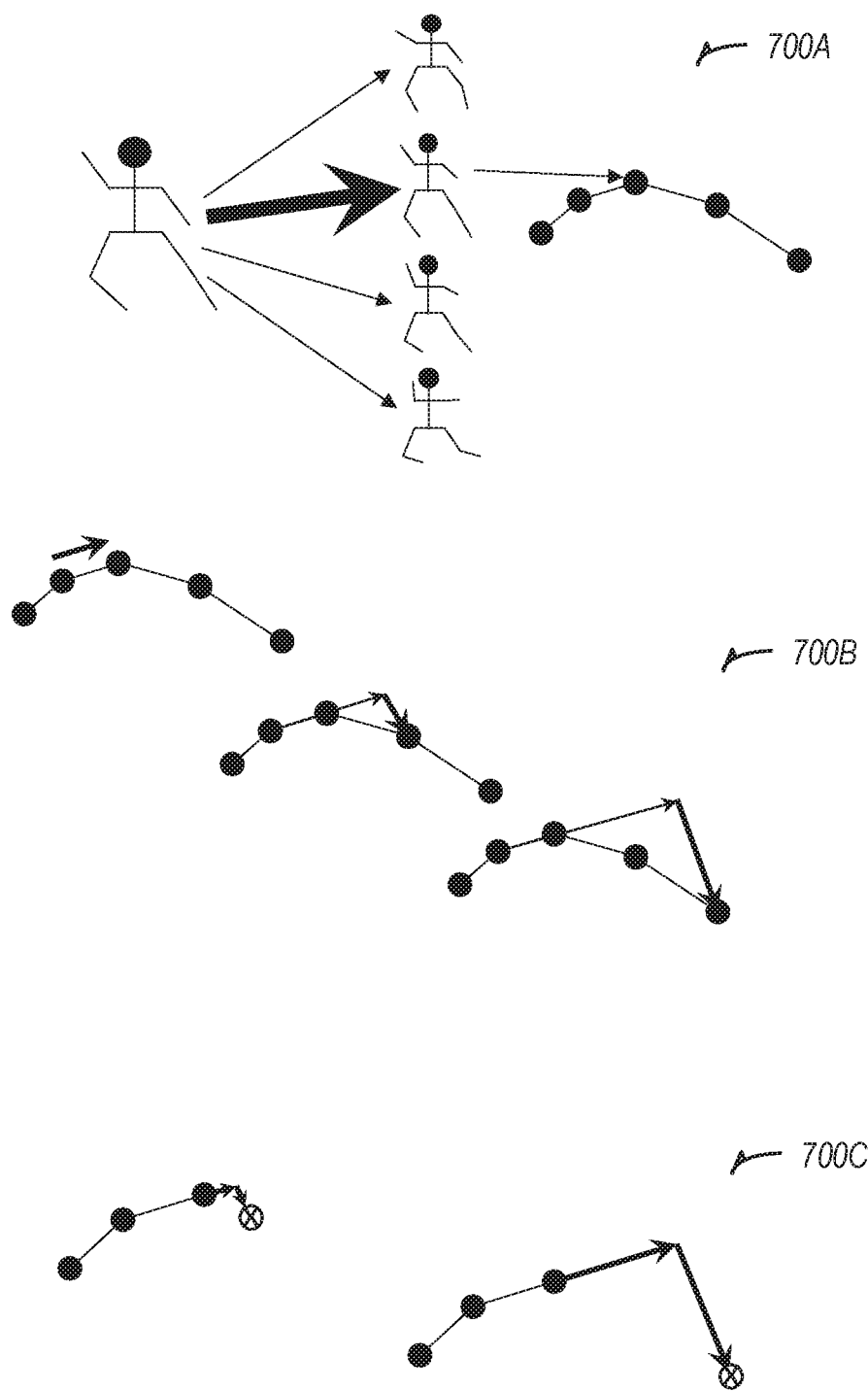
FIG. 7 illustrates a predictive interpolation flowchart in accordance with some examples.

FIG. 7 illustrates a predictive interpolation flowchart in accordance with some examples.

Operation 700A illustrates context matching. In an example, a Pruned Nearest Neighbor process matches user position to a certain position in the time series of a reference model. This matching identifies the time value within the time series that are used. This time value points to specific points within each of the trajectories of the reference model that localize the 1-retrograde delta and RM-RPA are used to make predictions.

Operation 700B illustrates calculating vectors. 1-retrograde deltas and RM-RPA's are calculated. The thick arrow in the upper left diagram is the 1-retrograde delta. In the middle diagram, the 1-retrograde delta is scaled one frame forward (it is the thin arrow here). The difference between its new endpoint and the actual body segment position point one frame forward is the RM-RPA for predicting one frame forward. n this diagram the RM-RPA is the thick arrow. In the bottom right diagram, the 1-retrograde delta is scaled two frames forward triple its original length and the RM-RPA is the difference between the scaled 1-retrograde delta's endpoint and the body segment's position two frames forward. Again the thin arrow is the scaled 1-retrograde delta and the RM-RPA is the thick arrow.

Operation 700C illustrates generating predictions of fractional numbers of input frames forward. In predictive interpolation, the same mechanisms are used to generate predictions from 1-retrograde deltas and RM-RPAs, but where both are scaled by a non-whole-number-of-frames-forward factor. This works like the velocity scaling factor. The 1-retrograde delta scales by the fractional number of frames forward and again is positioned such that its tail is at the current location of the body segment. The RM-RPA scales by the square of ratio of the fractional number of frames forward divided by that number rounded up to the nearest whole number. These are modified, in the example case that velocity doesn't match perfectly by the multiplying both, by the ratio of the user velocity to reference model velocity. In the RM-RPA, this multiplication is done after rounding up the denominator, but before squaring.

FIG. 7 illustrates a process that adjusts a runtime predicting system to predict to arbitrary time specifications into the future. In an example, the process of FIG. 7 produces higher frame rates than the sensors produce within the runtime predictive system. In another example, this interpolation process may be used to push the time targets forward into the future even further so as to display the user avatar to represent a position the user is moving toward that they may not yet have arrived at when this position is displayed to the user. In other words, by advancing the time targets to points in the future from the perspective of when they may be displayed, the user may see a representation of their position before they get to that position. This may be done an arbitrary number of milliseconds forward from the display time. The precise number may be task and user dependent. The dynamics involved in finding most useful forward time targets may be further refined user testing of software after implementations are created.

The method is to target fractional values of frames in advance of the delivery of the depth sensor inferences and to do so at regular intervals to allow a higher number of frames per second than the data is coming in.

For predicting beyond one frame in advance, whole numbers of frames as a parameter in the prediction mechanism may be used.

Fractional values for the time parameter of a projection targets may be used (this may be parameterized in milliseconds in which case it may just be the right number of milliseconds which corresponds to the fractional frames value).

An example depth sensor frame rate is 30 hz (e.g., targeted depth sensors for the Microsoft Kinect are 30 hz).

Output frame rate examples 60 fps or 90 fps:

Convert to milliseconds per frame (divide 1000 by the number of frames per second).

Scaling factors for prediction calculations—scale the time parameter.

60 fps:

Produce on-input-frame-timing prediction.

Produce one interpolated frame beyond that which is timed to land half way between on-input-frames.

90 fps:

Produce on-input-frame-timing prediction.

Produce first interpolated frame beyond the on-input-timing frame which is timed to land ⅓ of the way between on-input-frames.

Produce second interpolated frame beyond the on-input-timing frame which is timed to land ⅔ of the way between on-input-frames and then back to the next on-input-timing-frame.

Do this by executing parallel calculations for on-input-frame-timing and subsequent interpolated frames using usual predictive calculation scheme but with appropriate time-parameter-scaling.

EXAMPLES

In an example, each of these assume that the system is slow speed execution mode and thus predicting between 1 and 2 frames in advance. For medium speed execution (between 2 and 3 frames in advance), add 33 ms to each figure below. Generally add 33 ms for each frame further in advance to predict.

At 60 fps, the next on-input-timing frame may be 33 ms after the previous on-input-timing frame (which is the timing of the depth sensor readings the prediction may be based on in the slow speed execution mode . . . add 33 ms for each frame added for higher speed execution).

The first interpolated frame after that may be 50 ms after the depth sensor readings the prediction may be based on.

At 90 fps, the next on-input-timing frame may again be 33 ms after the previous on-input-timing frame (which is the timing of the depth sensor readings the prediction may be based on in the slow speed execution mode . . . add 33 ms for each frame added for higher speed execution).

The first interpolated frame after that may be 44 ms after the depth sensor readings the prediction may be based on.

The second interpolated frame after that may be 56 ms after the depth sensor readings the prediction may be based on.

When executing the scaled time parameter calculations to find the RM-RPA delta delta from within the reference model time series, interpolation in the reference model may be performed to find the point in the reference model trajectory that may have been the "actual" location at the predicted time. While the 1-retrograde delta can simply be scaled with the time parameter and can be calculated the same way as usual, the RM-RPA, on the other hand uses a location in the reference model from which to calculate a distance.

In order to account for the fact that the RM-RPA has no point in between frames in the reference model that it can use to generate a distance calculation from. It is calculated as the distance from the scaled 1-Retrograde delta to the actual point in the reference model at the target time. Without a point in the reference model at that time the RM-RPA may not be able to be calculated. Instead a mix of the two nearest well defined RM-RPAs may be used.

For example, establishing a RM-RPA for 1.333 input frames forward, may use a weighted average of the RM-RPA for one input frame forward and the one for two input frames forward.

The weighting may be based on time proximity to each of those frames. The weighing for each RM-RPA may be 1 minus the quantity of the absolute value of the target timing less the specific RM-RPA's timing (first RM-RPA or second RM-RPA).

In the example, this gives ⅔ weight for the RM-RPA for 1 frame forward and a ⅓ weight for the RM-RPA 2 frames forward. This may place it ⅓ the distance from the actual points 1 and 2 frames forward and that is, approximately, what the time target of 1.33 frames forward is telling us.

An alternative method may use a denser reference model supplied by using extra smoothing operations to generate the needed points between points to create a basis for the RM-RPA, but as this may be a more data intensive model, it may be preferred to use the method described above.

Delta and delta-delta calculations are done with a time difference of one frame of 33 ms, so scaling them and calculations based on them rely on multiplying by the parameter that controls the time into the future being targeted and dividing by 33 ms.

Interpolation in post-processing may be performed without this process. Once a 30 fps representation is processed in post processing, an interpolation method can be used. There is no time for this in runtime processing, so the predictive interpolation method is used.

Runtime Predicting Utilizing Frame-target Timing Parameterization and Pruned Nearest Neighbor Control.

Runtime predicting may arise from regular delivery of body segment positional representations from sensors and operations performed on the quantifications of those representations. In this model, the first action is to compare data about the position and motion of the user's body coming in from sensors using the Pruned Nearest Neighbor algorithm described elsewhere in this disclosure.

The match identified by the Pruned Nearest Neighbor directs the system to a certain location in the look up table to find the relevant 1-retrograde delta and RM-RPA vectors. More than one each of 1-retrograde deltas and RM-RPA vectors may be used if either or both of the following are true. Frame-target timing parameters may use more than one predicted output frame for each input frame from sensors (for example when output frame rate is higher than input frame rate). Multiple approximate predictions are calculated and then blended via weighted average to give the final prediction. Operations on parameterization may define which elements of the look-up table are sourced.

In an example, parameterization determines which predicted time targets downstream from each incoming frame data are used to search the look-up table for the vectors needed to generate predictions which meet those targets. For example, the look-up table may be time indexed, with RM-RPA values derived from a 1-retrograde delta from time $t_1$ and calculated as the difference from a scaled version of that 1-retrograde delta to the actual reference model position of that body segment at a targeted time $t_2$ in the future may be indexed by $(t_1, t_2)$. $t_1$ is determined by the Pruned Nearest Neighbor matching and $t_2$ is based on adding a certain time delta to $t_1$ where the specific time delta is determined by parametrization.

If more than one set of 1-retrograde delta and RM-RPA vector are to be sourced (for either or both of the reasons above) several different time deltas may be applied leading to several $t_2$ values each directing to their own RM-RPA vector. The 1-retrograde delta depends only on $t_1$, but RM-RPAs depend on $t_1$ and $t_2$ (another way to say this is that there may be only one 1-retrograde delta for each $t_1$, but there may be more than one RM-RPA for each $t_1$ where the different RM-RPAs are further specified by their $t_2$ value).

Once 1-retrograde deltas and RM-RPA vectors are found, they are used to calculate predictions as defined in the Latency Reduction or Predictive Interpolation processes.

If all targeted $t_2$ times existed in the look-up table, then once predictions are generated, the system may proceed to the next step. If not, then an interpolation process may be done for each targeted $t_2$ that was not stored in the table using predictions from the two closest $t_2$ values that were stored in the table (and from the same $t_1$). These may be averaged together to give the real prediction for the targeted $t_2$. This would be known up front once parameterization is established so both of these RM-RPAs would be sourced as needed. This average may be weighted by how close each of the $t_2$ values that are in the table are to the targeted $t_2$ value.

This would be the case if the process of setting up the look-up table didn't anticipate the need for the specific timing targets that the parameterization settings require.

If predictions from multiple $t_1$ values in the past had the same ultimate $t_2$ value (more than one separate predictions from more than one different times in the past both apply to the same targeted time) then they would be averaged together to produce a final composite prediction. This average may be weighted by the size of the time delta between the $t_1$ and $t_2$ values involved in each separate prediction. If this is method is used, each prediction may be stored in a buffer indexed by its final time, $t_2$ so that they are ready for averaging as soon as all the predictions for that time have been calculated and their averaging can begin.

Figure 8:
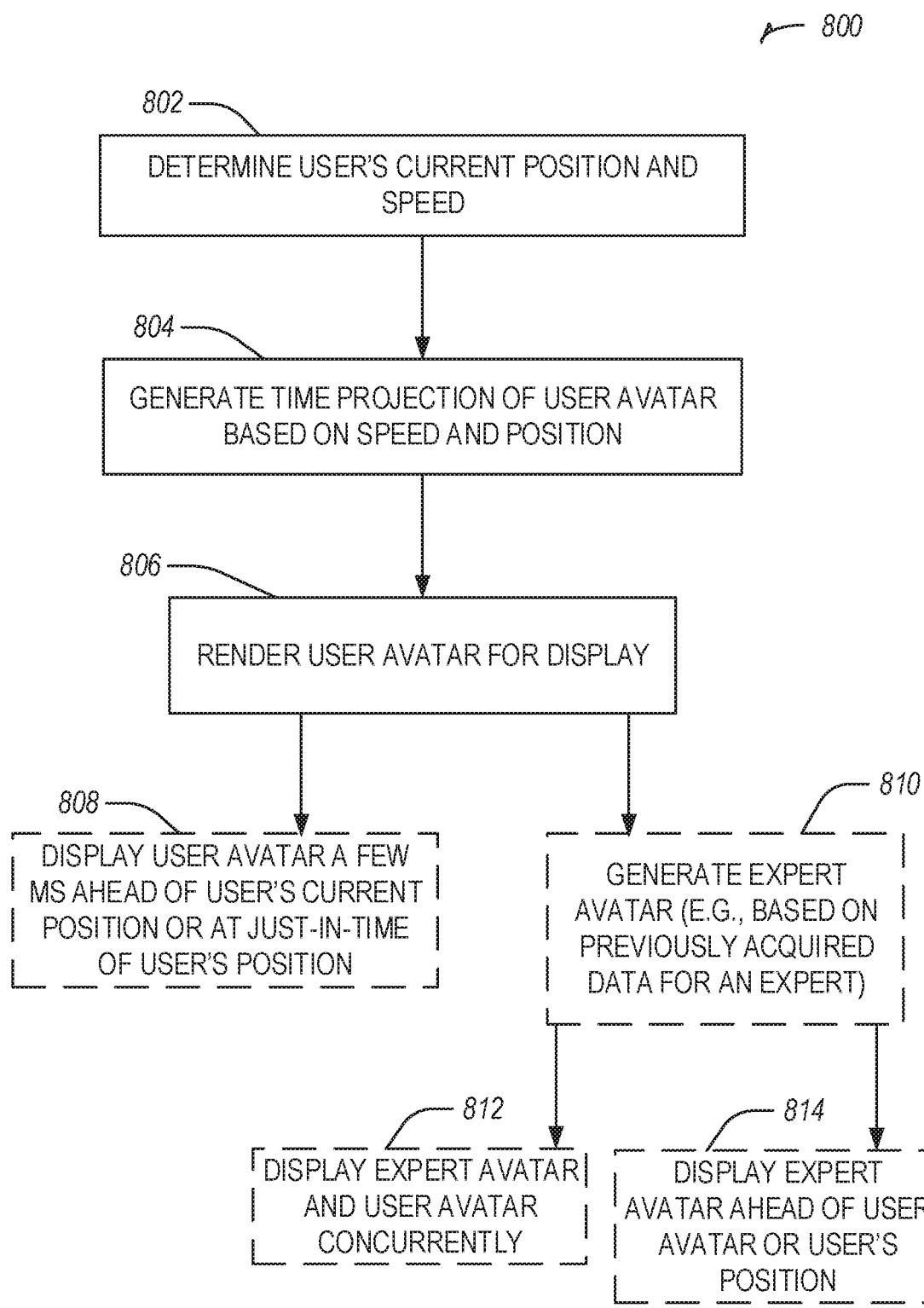
FIG. 8 illustrates a flowchart showing a process for displaying an avatar or multiple avatars in accordance with some examples.

FIG. 8 illustrates a flowchart showing a process 800 for displaying an avatar in accordance with some examples.

The process 800 includes an operation 802 to determine a user's current position and speed.

The process 800 includes an operation 804 to generate a time projection of an avatar based on the speed and position of the user.

The process 800 includes an operation 806 to render a user avatar for display.

The process 800 includes an optional operation 808 to display the user avatar a few milliseconds (e.g., 1 ms to 500 ms) ahead of the user's current position or display the user avatar in real-time (e.g., just-in-time) to the user's position.

The process 800 includes an optional operation 810 to generate an expert avatar (e.g., based on previously acquired data from an expert in a particular action, such as a golf swing, a slap shot, a free throw, etc.).

The process 800 includes an optional operation 812 to display the expert and the user avatar concurrently. For example, with the expert avatar further from the user than the user avatar, both within a user's field of view. Operation 812 may include displaying the expert avatar and the user avatar just in time of the user's position or a few ms ahead of the user's position.

The process 800 includes an optional operation 814 to display the expert ahead of the user avatar. For example, with the expert avatar a few ms ahead of the user's current position, with the user avatar displayed in real-time.

Avatars presented in the process 800 may be presented in an augmented or virtual reality setting.

Figure 9:
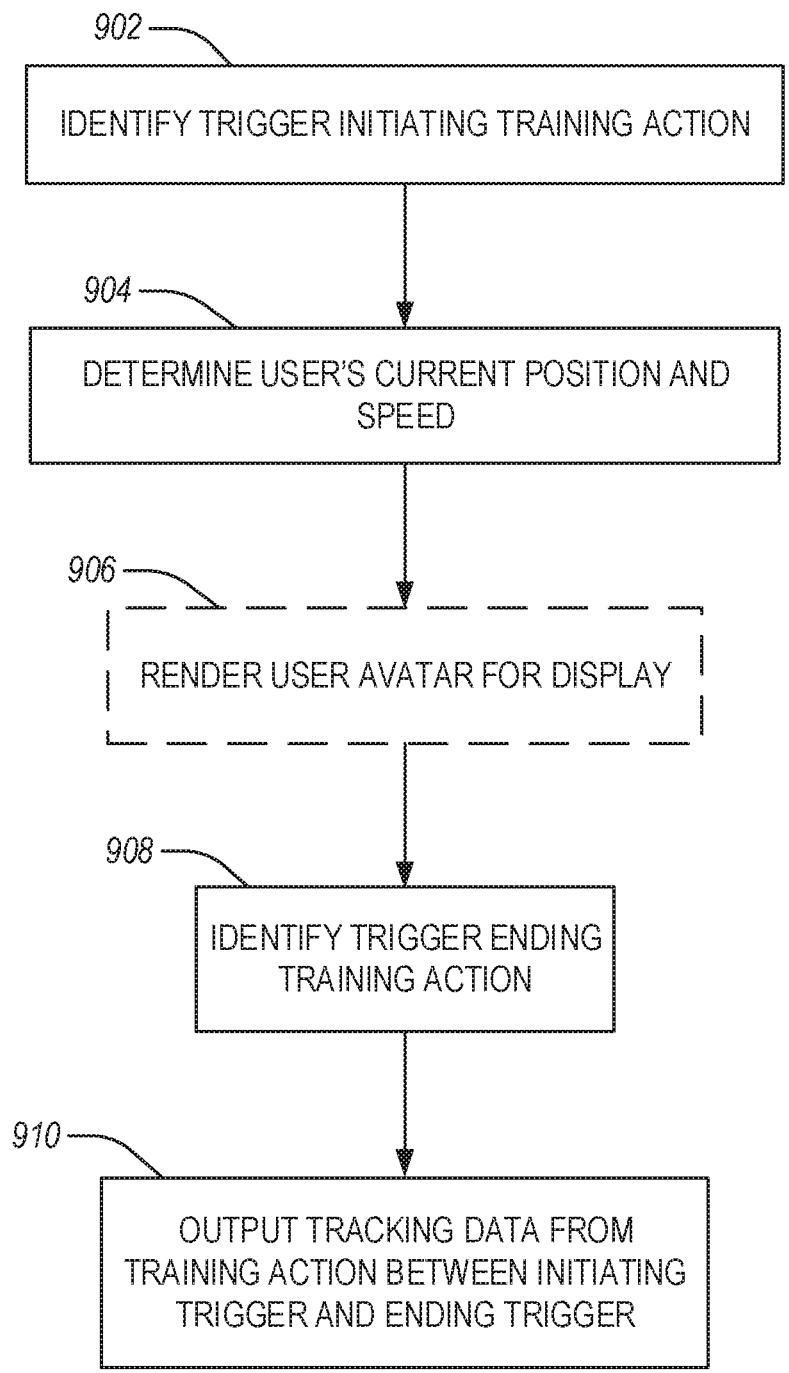
FIG. 9 illustrates a flowchart showing a process for triggering capture of training data in accordance with some examples.

FIG. 9 illustrates a flowchart showing a process 900 for triggering capture of training data in accordance with some examples.

The process 900 includes an operation 902 to identify a trigger that initiates a training action (e.g., a golf swing, a slap shot, a free throw, etc.).

The process 900 includes an operation 904 to determine a user's current position and speed.

The process 900 includes an optional operation 906 to render a user avatar for display, for example based on the user's current position and speed. In an example, rendering may occur before operations 902 or 904, for example with the latency of depth sensor to visual processing. After operation 908, the render may be modified by latency reduction until a second trigger where it goes back to usual latency mode.

The process 900 includes an operation 908 to identify a trigger that ends the training action.

The process 900 includes an operation 910 to output tracking data (e.g., of the user or an instrument of the user, such as a golf club, a hockey stick, a ball, etc.) from the training action between the initiating trigger and the ending trigger. The output tracking data may include data from a few ms or seconds before the initiating trigger or data from a few ms or seconds after the ending trigger, in an example. In an example, operation 910 applies the trigger concept to trimming the motion to the beginning of the process 900 and to the end of the process 900 in an automated way when creating a new user avatar in the post-processing use case. In an example, a real-time use case may include using the trigger system to modify the latency that the user experiences.

Figure 10:
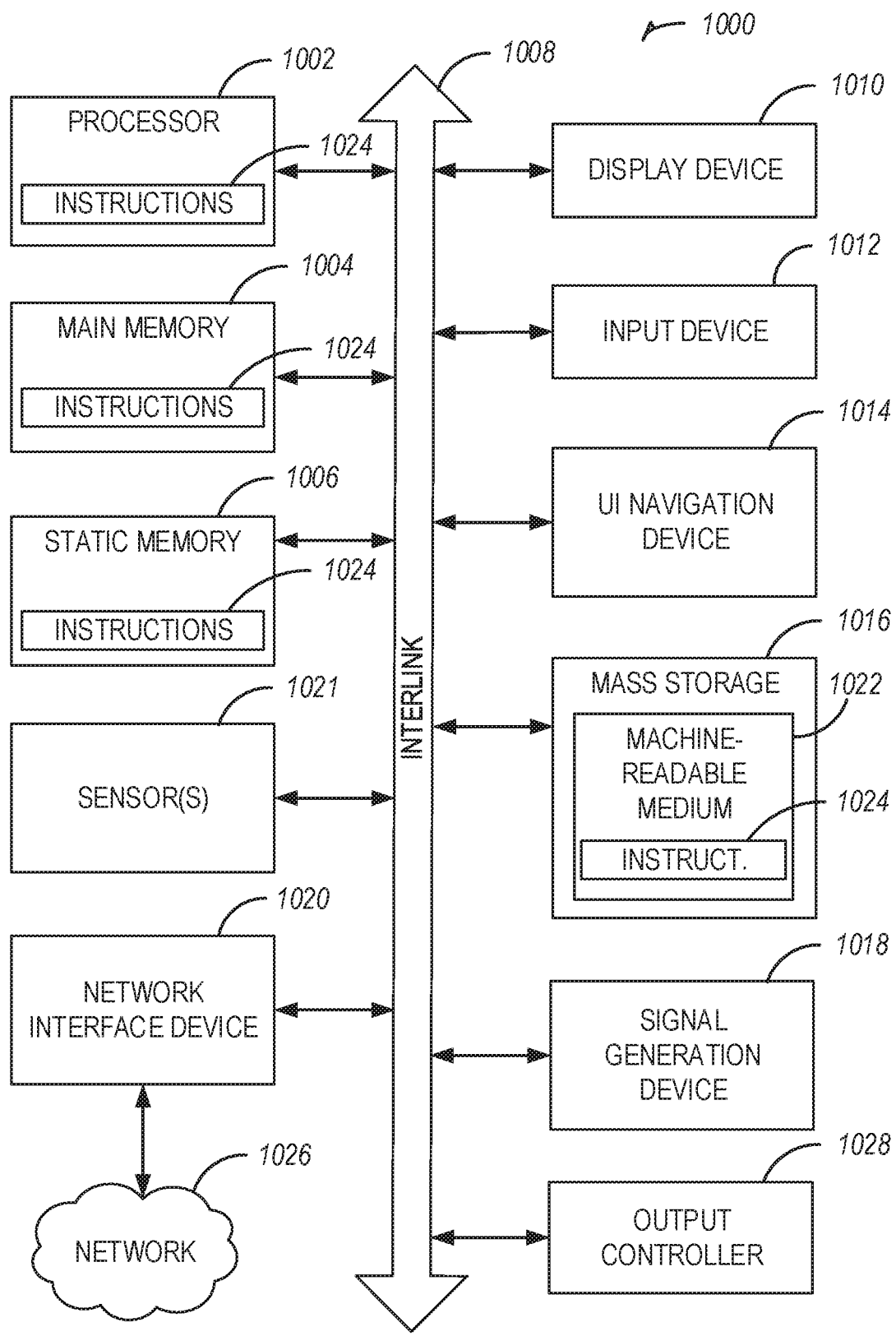
FIG. 10 illustrates a block diagram of an example of a machine upon which any one or more of the processes discussed herein may perform in accordance with some embodiments.

FIG. 10 illustrates a block diagram of an example machine 1000 upon which any one or more of the processes discussed herein may perform in accordance with some embodiments. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the processes or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, or associated caches and servers) configured to store the one or more instructions 1024. The term "machine readable medium" may include any medium that is capable of storing, encoding, or carrying instructions for execution by the machine 1000 and that cause the machine 1000 to perform any one or more of the processes of the present disclosure, or that is capable of storing, encoding or carrying data structures used by or associated with such instructions. Non-limiting machine readable medium examples may include solid-state memories, and optical and magnetic media.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) processes. The term "transmission medium" shall be taken to include any intangible medium that is capable of storing, encoding or carrying instructions for execution by the machine 1000, and includes digital or analog communications signals or other intangible medium to facilitate communication of such software.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
receiving at least three images of a user performing a technique;
determining, using a processor, a position and velocity of a portion of the user from a first to a second image of the at least three images, the second image captured after the first image;
determining a reference model corresponding to the technique, the reference model including a plurality of frames in a sequence including a first frame corresponding to the first image, the reference model including position and motion data of an avatar;
searching the plurality of frames using a nearest neighbor technique, to determine a second frame of the plurality of frames that corresponds to the second image of the at least three images based on the position and velocity of the portion of the user, the second frame separated from the first frame by at least one frame;
accessing kinematic data from a look-up table related to the second frame; and
outputting the kinematic data for use in displaying the avatar.

2. The method of claim 1, further comprising determining an initial frame for the technique based on an initial position of the portion of the user, and tracking the portion of the user in response to determining the initial frame.

3. The method of claim 1, wherein the avatar is an expert model avatar.

4. The method of claim 3, further comprising displaying the avatar in a position corresponding to the second frame of the plurality of frames that corresponds to the second image.

5. The method of claim 3, further comprising displaying the avatar in a position corresponding to a subsequent frame after the second frame in a time-advanced position.

6. The method of claim 1, wherein the avatar includes a previous user attempt avatar.

7. The method of claim 1, wherein the plurality of frames are selected based on a ratio of the velocity of the portion of the user to the motion data of the avatar.

8. The method of claim 1, further comprising determining an ending frame for the technique and ending tracking of the portion of the user in response to determining the ending frame.

9. The method of claim 1, further comprising determining a third frame corresponding to a third image of the at least three images, the third image captured after the second image, the third frame occurring before the second frame in the sequence.

10. A system comprising:
memory; and a processor, coupled to the memory, the memory including instructions, which when executed by the processor, cause the processor to:
receive at least two images of a user performing a technique;
determine a position and velocity of a portion of the user from a first to a second image of the at least two images, the second image captured after the first image;
determine a reference model corresponding to the technique, the reference model including a plurality of frames in a sequence including a first frame corresponding to the first image, the reference model including position and motion data of an avatar;
searching the plurality of frames to determine, using a nearest neighbor technique, a second frame of the plurality of frames that corresponds to the second image of the at least two images based on the position and velocity of the portion of the user;
accessing kinematic data from a look-up table related to the second frame; and
output the kinematic data for use in displaying the avatar.

11. The system of claim 10, wherein the processor is further caused to determine an initial frame for the technique based on an initial position of the portion of the user, and tracking the portion of the user in response to determining the initial frame.

12. The system of claim 10, wherein the avatar is an expert model avatar.

13. The system of claim 12, wherein the processor is further caused to output the avatar for display in a position corresponding to the second frame of the plurality of frames that corresponds to the second image.

14. The system of claim 12, wherein the processor is further caused to output the avatar for display in a position corresponding to a subsequent frame after the second frame in a time-advanced position.

15. The system of claim 10, wherein the avatar includes a previous user attempt avatar.

16. The system of claim 10, wherein the plurality of frames are selected based on a ratio of the velocity of the portion of the user to the motion data of the avatar.

17. The system of claim 10, wherein the processor is further caused to determine an ending frame for the technique and ending tracking of the portion of the user in response to determining the ending frame.

18. The system of claim 10, wherein the processor is further caused to determine a third frame corresponding to a third image of the at least two images, the third image captured after the second image, the third frame occurring before the second frame in the sequence.

19. A method comprising:
receiving a first image of a user performing a technique;
identifying position and velocity information of the user at a time of capture of the image;
determining a reference model corresponding to the technique, the reference model including a plurality of frames in a sequence having a first frame including an avatar in a position corresponding to the position of the user in the first image;
applying, using a processor, the velocity information of the user to the first frame to alter the position of the avatar;
searching the plurality of frames, using a nearest neighbor technique, to determine a second frame of the plurality of frames corresponding to the altered position of the avatar;
accessing kinematic data from a look-up table related to the second frame; and
outputting the kinematic data for displaying a second image of the user performing the technique.

20. The method of claim 19, further comprising modifying the second image, before display, according to second received position information of the user at a second time.

* * * * *